US009769471B2

(12) United States Patent
Chin et al.

(10) Patent No.: US 9,769,471 B2
(45) Date of Patent: Sep. 19, 2017

(54) METHODS FOR DETERMINING LOCALIZED OUTAGES AND DISTRIBUTED SIGNAL VERIFICATION OF SET-TOP BOXES

(71) Applicant: The DIRECTV Group, Inc., El Segundo, CA (US)

(72) Inventors: Kian-Vine Chin, Torrance, CA (US); Woei-Shyang Yee, Irvine, CA (US); Wesley W. Huie, Riverside, CA (US); Gerard V. Talatinian, Foothill Ranch, CA (US); Christopher Yang, Temple City, CA (US); Heesoon E. Kim, Redondo Beach, CA (US); Robert S. Greenwade, Carson, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

(21) Appl. No.: 14/590,216

(22) Filed: Jan. 6, 2015

(65) Prior Publication Data
US 2016/0198152 A1 Jul. 7, 2016

(51) Int. Cl.
*H04N 7/173* (2011.01)
*H04N 17/04* (2006.01)
(Continued)

(52) U.S. Cl.
CPC ............. *H04N 17/04* (2013.01); *G06F 11/30* (2013.01); *H04H 20/12* (2013.01); *H04N 7/20* (2013.01);
(Continued)

(58) Field of Classification Search
CPC ................... H04N 21/4424; H04N 21/4425
See application file for complete search history.

(56) References Cited

U.S. PATENT DOCUMENTS 7,080,398 B1  7/2006 Wichelman et al.
7,895,632 B2 * 2/2011 Sadja ................ H04N 7/17309
                                                    348/180
(Continued)

FOREIGN PATENT DOCUMENTS

DE    102011012609 A1   8/2012
WO      2005031520 A2   4/2005

OTHER PUBLICATIONS

International Search Report and Written Opinion dated Mar. 14, 2016 in International Application No. PCT/US2015/068015 filed Dec. 30, 2015 by Kian-Vine Chin et al.

*Primary Examiner* — Gigi L Dubasky
(74) *Attorney, Agent, or Firm* — Guntin & Gust, PLC; Matthew Tropper

(57) ABSTRACT

Embodiments disclose systems and methods for testing and determining outages of communication systems. A server can receive signal-reception-related information from set-top boxes (STBs) in a particular geographical region, where a STB: receives signals having a predefined pattern, generates a comparison of the predefined pattern to reference patterns stored on the STB, generates the signal-reception-related information based on the comparison, and sends the signal-reception-related information. The server can determine an outage status for the particular geographical region based on the signal-reception-related information. The server can generate an output based on the outage status. The output is configured to provide information related to the outage status of the particular geographical region and information for possible responses related to the outage status. The server can send the output.

31 Claims, 12 Drawing Sheets

(51) Int. Cl.
*H04N 21/61* (2011.01)
*H04N 21/658* (2011.01)
*H04H 20/12* (2008.01)
*H04N 7/20* (2006.01)
*G06F 11/30* (2006.01)
*H04N 21/24* (2011.01)
*H04N 21/442* (2011.01)
*H04N 17/00* (2006.01)

(52) U.S. Cl.
CPC ....... *H04N 17/004* (2013.01); *H04N 21/2402* (2013.01); *H04N 21/2408* (2013.01); *H04N 21/44209* (2013.01); *H04N 21/6118* (2013.01); *H04N 21/6143* (2013.01); *H04N 21/6168* (2013.01); *H04N 21/6193* (2013.01); *H04N 21/658* (2013.01)

(56) References Cited

U.S. PATENT DOCUMENTS

| | | | |
|---|---|---|---|
| 2006/0168191 A1* | 7/2006 | Ives | G06F 11/3079 709/224 |
| 2009/0133055 A1* | 5/2009 | Lock | H04N 7/025 725/33 |
| 2012/0144250 A1 | 6/2012 | Lee | |
| 2012/0231745 A1* | 9/2012 | Gregg | H04B 17/309 455/67.12 |

* cited by examiner

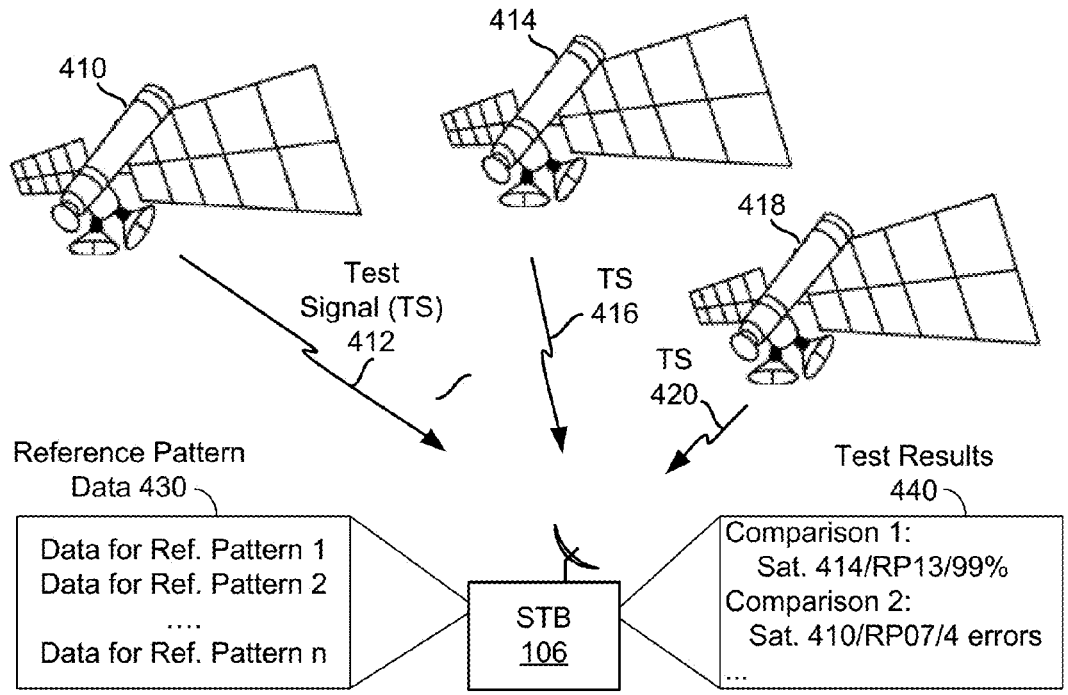

FIG. 4A

Display 450

| | Ch. 488881<br>Test Channel | 3:45 PM<br>Wed. 11/19 |
|---|---|---|
| | 8 AM 11/19 – 8 AM 11/20 | |//
| Instructions: This test channel is used to verify your equipment is working properly. Testing will begin after tuning to this channel for more than 60 seconds or after pressing the <TEST> button on your remote or set-top box. |||
| Automatic Signal Comparison for Channel 488881<br>Status: [Starting\|Running\|Complete]<br>　　　　　　　　　Result #1<br>Input Source: Pattern p, Satellite ddd °, Transponder(s) t1,[t2...]<br>STB Information: Model: mmmmm Reference Pattern rp<br>Comparison Time: mm/dd/yy hh:mm:ss<br>Test Result: [ yy% correct \| ee Errors \| Pass \| Fail \| ... ]<br>Test Duration: [dd seconds \| mm minutes \| .... ]<br>... || Test<br>Reporting<br>Template<br>460 |

FIG. 4B

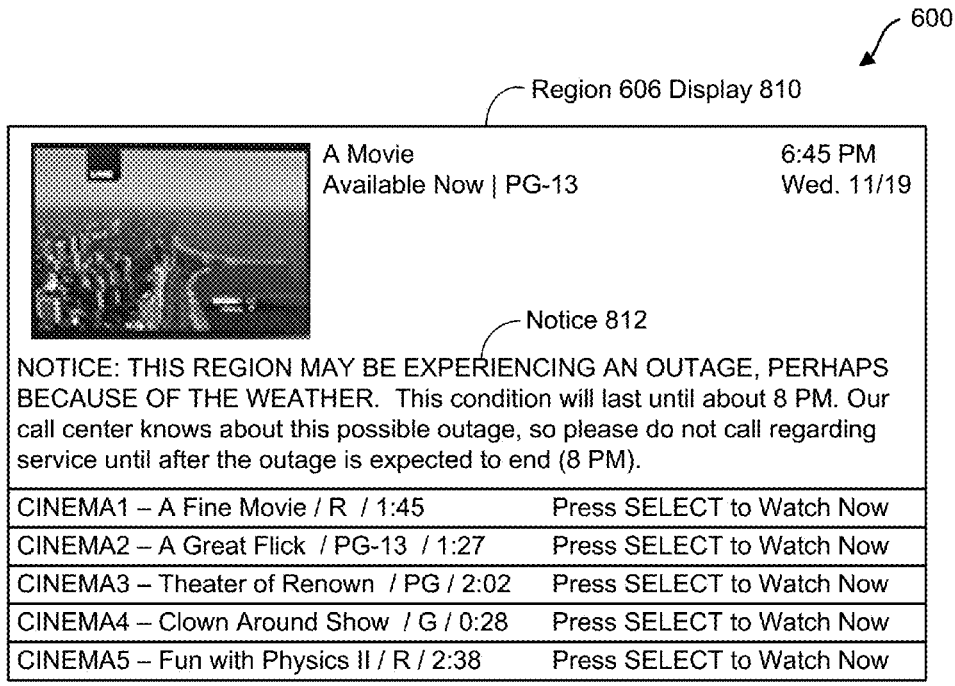
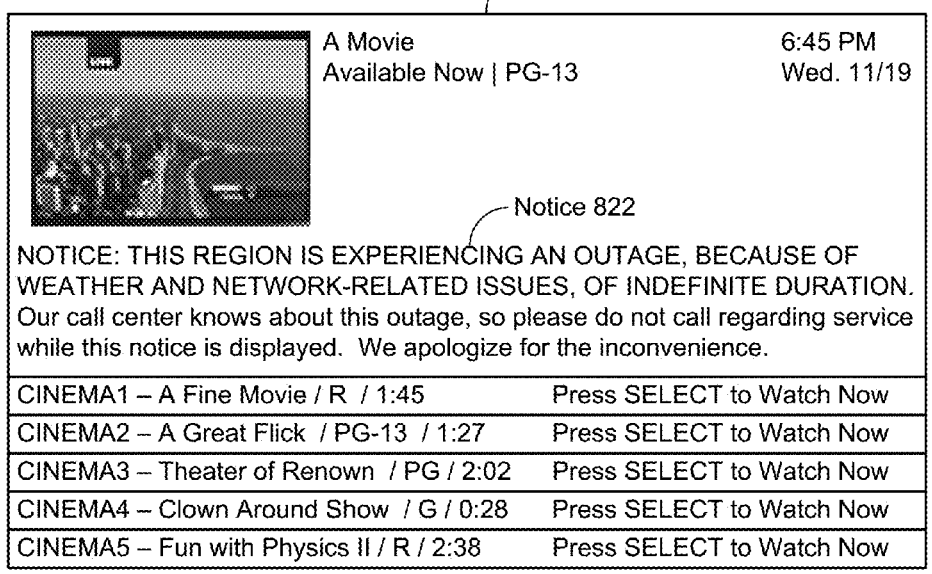
FIG. 8

METHODS FOR DETERMINING LOCALIZED OUTAGES AND DISTRIBUTED SIGNAL VERIFICATION OF SET-TOP BOXES

BACKGROUND

In providing communications-related services to customers, such as satellite-based communications services, occasionally outages occur. In some environments, outages are first determined by customer complaints to the communication service provider. Then, personnel from the communication service provider can receive complaints about outages, typically via telephone calls to customer service call centers, and determine whether the complaints are related to environmental conditions, failures in customer equipment, such as set-top boxes, or failures in equipment controlled by the communication service provider.

Part of this determination about outages can depend on testing performed on the customer equipment. Example testing includes testing which signals are received and sent by the customer equipment, and signal strength testing for received and/or sent signals. In some networks, signal integrity tests are performed. Traditional methods of signal integrity testing can involve establishing test stations in a distribution area that perform signal tests and running signal integrity tests at the time of set-top box installation. These traditional methods are costly, time-consuming, do not always provide suitable coverage, and/or do not provide timely coverage.

SUMMARY

In one aspect, a method is provided. A server receives signal-reception-related information provided by a plurality of set-top boxes. One or more set-top boxes of the plurality of set-top boxes are located in a particular geographical region. The server determines an outage status for the particular geographical region, where the outage status is based on the signal-reception-related information provided by one or more set-top boxes located in the particular geographical region. The server generates an output that is configured to provide information related to the outage status of the particular geographical region and information for possible responses related to the outage status. The server sends the output.

In another aspect, a server is provided. The server includes one or more processors and data storage, such as non-transitory computer-readable data storage. The data storage is configured to store at least computer-readable program instructions. The instructions are configured to, upon execution by the one or more processors, cause the server to perform functions. The functions include: receiving signal-reception-related information provided by a plurality of set-top boxes, where one or more set-top boxes of the plurality of set-top boxes are located in a particular geographical region; determining an outage status for the particular geographical region, where the outage status is based on the signal-reception-related information provided by one or more set-top boxes located in the particular geographical region; generating an output that is configured to provide information related to the outage status of the particular geographical region and information for possible responses related to the outage status; and sending the output.

In another aspect, an article of manufacture is provided. The article of manufacture includes a computer-readable storage medium that has instructions stored thereon that, in response to execution by one or more processors, cause the one or more processors to perform functions. The functions include: receiving signal-reception-related information provided by a plurality of set-top boxes, where one or more set-top boxes of the plurality of set-top boxes are located in a particular geographical region; determining an outage status for the particular geographical region, where the outage status is based on the signal-reception-related information provided by one or more set-top boxes located in the particular geographical region; generating an output that is configured to provide information related to the outage status of the particular geographical region and information for possible responses related to the outage status; and sending the output.

In one aspect, a method is provided. A set-top box receives one or more signals that include a predefined pattern of data. The set-top box stores one or more reference patterns of data. The set-top box generates a comparison between data in the predefined pattern of the received one or more signals and data in at least one reference pattern of the one or more reference patterns. The set-top box generates signal-reception-related information based on the comparison. The set-top box sends a message that includes the signal-reception-related information.

In another aspect, a set-top box is provided. The set-top box includes one or more processors and data storage, such as non-transitory computer-readable data storage. The data storage is configured to store at least computer-readable program instructions. The instructions are configured to, upon execution by the one or more processors, cause the set-top box to perform functions. The functions include: receiving one or more signals that include a predefined pattern of data, where the set-top box stores one or more reference patterns of data; generating a comparison between data in the predefined pattern of the received one or more signals and data in at least one reference pattern of the one or more reference patterns; generating signal-reception-related information based on the comparison; and sending a message that includes the signal-reception-related information.

In another aspect, an article of manufacture is provided. The article of manufacture includes a computer-readable storage medium that has instructions stored thereon that, in response to execution by one or more processors, cause the one or more processors to perform functions. The functions include: receiving one or more signals that include a predefined pattern of data; generating a comparison between data in the predefined pattern of the received one or more signals and data in at least one reference pattern of one or more stored reference patterns; generating signal-reception-related information based on the comparison; and sending a message that includes the signal-reception-related information.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

Various embodiments are described herein with reference to the following drawings, in which like numerals denote like entities, and in which:

FIG. 4A shows an example set-top box receiving signals from a number of satellites;

FIG. 4B shows an example test reporting display;

FIG. 8 shows example displays for the scenario of FIG. 6A;

DETAILED DESCRIPTION

Figure 1:
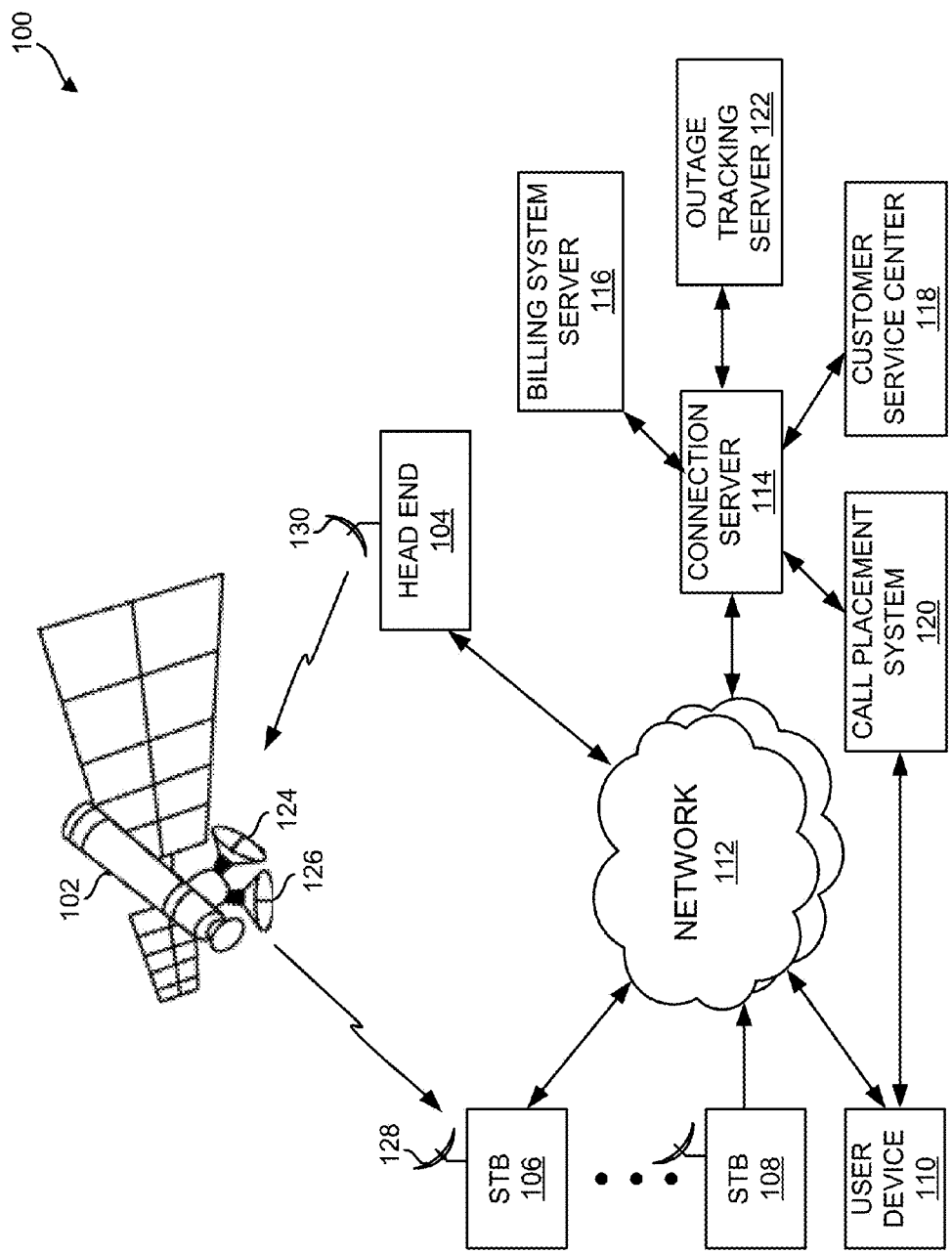
FIG. 1 is a simplified block diagram that illustrates a communication system in which embodiments of the disclosed methods and entities can be implemented.

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

Herein are described apparatus and methods that can help to verify signal integrity in connected television set-top boxes. Periodic signal integrity tests at a number of set-top boxes can provide a "big picture" view of the quality of satellite television signals in different geographic regions, and can be used to identify and address network outages in such geographic regions. For example, continuous and/or periodic reporting of signal integrity by many set-top boxes can provide data for a more complete view of network signal integrity, such that a satellite television service provider can more rapidly distinguish between a signal problem that is occurring throughout a large area (e.g., due to weather, or satellite issues) and an isolated problem affecting only a one or a few specific customer locations.

To facilitate signal-integrity tests, set-top boxes can each store one or more reference patterns. After being installed, the set-top box can periodically perform signal integrity tests, which are tests to verify that signals from various sources, such as signals broadcast by satellites. A signal integrity test can be performed by the set-top box tuning to a predefined channel that broadcasts a predefined pattern of data, such as a string of binary digits, audio data, video data, and/or images. Upon receiving the predefined pattern from the signals sent over the channel, the set-top box can compare the received predefined pattern to a corresponding stored reference pattern. Based on the comparison, the set-top box can determine integrity of the received signals on the channel.

The set-top box can report the results of the comparison to one or more destinations, such as a broadcaster of the signal, a customer account associated with the set-top box perhaps who requested the signal integrity test, to one or more servers within the communications network, and other destinations. The comparison results can be transmitted electronically; e.g., via Internet or via dial up methods.

The set-top box can provide signal-reception-related information, such as the results of signal integrity testing, to an outage tracking server. The outage tracking server can be configured to monitor geographical regions of the communication system for possible and actual transmission outages. In regions where enough set-top boxes provide such signal-reception-related information, the outage tracking server can aggregate the signal-reception-related information from the set-top boxes in a geographical region to determine transmission outages in the region, perhaps before service calls are made.

The herein-described outage tracking server can gather signal-reception-related information from multiple set-top boxes in one or more geographic regions and can aggregate the information on a region-by-region basis. For example, network-capable set-top boxes can periodically check reception quality to obtain signal-reception-related information. When reception quality falls below a defined threshold, periodically, or under other conditions, the set-top box can provide the signal-reception-related information to the outage tracking server.

The outage tracking server can then aggregate the signal-reception-related information from multiple set-top boxes in a geographical region, such as a zip code, neighborhood, or community, and determine if service outage has occurred in that geographical region. The aggregated results also can be used to determine whether a service outage was perhaps due to a known condition affecting a localized area; e.g., known meteorological conditions. The outage tracking server could provide up-to-date status to customers' set-top box to reduce and/or avoid potential service calls and corresponding service costs to the communication service provider and wasted time by customer's reporting already-known outages.

The herein-described techniques can provide additional information about signal reception in communications networks. That additional information can be used to track outages and compare outage-related information with information about possible causes of outages to help determine whether or not the possible causes are actually causing or contributing to an outage. Set-top box signal integrity testing can provide timely and additional information about signals received during periods of customer operation. By selecting predefined patterns for broadcast and corresponding reference patterns stored on set-top boxes, the signal integrity testing can be tuned to test signal-specific information; e.g., channels providing data services can use bit/data-oriented predefined and reference patterns, channels providing respective audio or video services can use respective audio or video patterns. This information can be used to save customer time calling call centers, concentrate support efforts onto regions with outages, and to provide additional data about received signals during operation of communication networks.

I. Example Communication System

Referring now to the figures, FIG. 1 is a simplified block diagram that illustrates a communication system 100 in which embodiments of the disclosed methods and entities can be implemented. The communication system 100 may include a satellite 102, a head end 104, one or more set-top boxes 106, 108, one or more user devices 110, one or more networks 112, and one or more servers, such as a connection server 114, a billing system server 116, a customer service center server 118, and a call placement system server 120. Other devices may also be included in the communication system 100. It should be understood that, although not illustrated, multiple satellites, head ends, servers, and other components might be included in the communication system 100. Moreover, while multiple components are illustrated separately, it should be understood that one or more of the components may be implemented as distributed components.

Satellite 102 may include one or more antennas 124, 126 configured to send and receive digital or analog signals to one or more devices in the communication system 100. For instance, satellite 102 may include a first antenna 124 configured to receive data via an uplink signal from a device, such as head end 104. Satellite 102 may also include a second antenna 126 that may transmit data via a downlink signal to a receiving device. The receiving device may be a mobile device or a stationary device. Set-top boxes 106, 108 or user device 110 may be a mobile device or a stationary device. In some examples, a single antenna may be used to receive data via an uplink signal and transmit data via a downlink signal. Other examples are also possible.

Head end 104 may include a transmitting antenna 130 for communicating data using one or more signals. For instance, transmitting antenna 130 may send signals to the antenna 124 at satellite 102. Satellite 102 may in turn send downlink signals to a receiving device, such as set-top box 106. In another instance, head end 104 may communicate data to set-top box 106 via a network 112. Network 112 may be representative of one or more types of networks, such as a public switched telephone network, the Internet, a mobile telephone network, or other type of network.

Set-top boxes 106, 108 are examples of receiving devices configured to receive data from satellite 102 or network 112. For example, set-top box 106 may include or be connected to an antenna 128 for receiving downlink signals from antenna 126. Set-top box 106 may also include one or more components structured and arranged to receive signals from network 112. The type, content, and number of signals received by set-top box 106 may vary. For instance, the signals may be media signals that may include video or audio signals. Data sent via the media signals may include content, program data, images, requests, or the like. Other examples are also possible.

In some examples, set-top boxes 106, 108 may be interconnected with one or more devices in the communication system 100 via a local network (not illustrated). The local network, which may be a wired network or wireless network, may be used to interconnect set-top boxes 106, 108 within a household, multi-dwelling unit, or commercial building. The local network may also allow for multi-room viewing of content stored on a first set-top box (such as set-top box 106) and communicated to a second set-top box (such as set-top box 108) through the local network. The stored content can comprise content a set-top box 106 receives from antenna 128.

User device 110 may include a variety of stationary or mobile computing devices. For example, user device 110 may include a landline telephone, cellular telephone, smartphone, personal computer, laptop computer, tablet computer, personal digital assistant (PDA), portable media player, or other computing device now known or later developed. User device 110 may be configured to send or receive data in a variety of ways. For example, user device 110 may receive downlink signals from antenna 124. In another example, user device 110 may send or receive signals from network 112. In yet another example, user device 110 may send or receive signals from one or more devices in the communication system 100. For instance, user device 110 may send or receive signals from set-top boxes 106, 108 via network 112. Other examples are also possible.

Communication system 100 may also include one or more servers, such as a connection server 114. Connection server 114 may include an enterprise service bus (ESB), and be configured to send and/or receive data from one or more devices via network 112. For example, connection server 114 may send and/or receive signals from set-top box 106 via network 112. In some instances, the signals may include one or more requests for information relating to a subscriber, service, or signal available at set-top box 106 and corresponding responses to the one or more requests. However, other instances are also possible. After the connection server 114 receives data, the connection server 114 may process or communicate the received data to one or more other servers or components in the communication system 100, a head end; e.g., head-end 104, and/or one or more set-top boxes; e.g., set-top box 106, 108.

Connection server 114 may communicate with billing system server 116. Billing system server 116 may include information that may be used for purposes of calculating, creating, and maintaining bills. For example, the information may include account information including a customer or subscriber identifier (ID), such as a name, login, or unique subscriber ID, associated with a subscriber. The account information may also include: (i) location data for the subscriber (e.g., a subscriber address, city, state, zip code, county, country, etc.), (ii) service area information (e.g., a geographical region where a service is available), (iii) phone number data (e.g., one or more phone numbers associated with the subscriber), (iv) language information (e.g., one or more spoken or written languages, such as English, Spanish, French, Chinese, etc., which may be used to communicate with the subscriber), (v) a subscription-level indicator, such as an indication that the customer has a basic, intermediate, or premium subscription, for instance, (vi) a start date or end date of the subscription, (vii) the duration of time (e.g., the number of years) that the subscriber has had a subscription, (viii) current balance data, or (ix) outstanding balance data, among other possibilities.

In some examples, billing system server 116 may receive one or more information requests from one or more servers and respond to the request by sending the requested information to the requesting or designated server. For instance, billing system server 116 may receive an information request for subscriber phone numbers from connection server 114. Billing system server 116 may respond to the information request by sending the requested subscriber information to connection server 114. Upon receipt, connection server 114 may send the received phone number information to set-top box 106. Other examples are also possible.

Connection server 114 may also communicate with customer service center server 118. Customer service center server 118 may comprise a server that is configured to distribute calls to one or more CSRs. Call distribution may be performed using any number of data structures, such as a queue, priority queue, bonded queue, double-ended queue, or other data structure that allows data to be organized.

In some examples, connection server 114 may receive a call request from set-top box 106 and send the call request to customer service center server 118, which may receive the call request and identify a queue in which to place the call request. Customer service center server 118 may use customer information to identify that the call request is associated with a subscriber in a specific location, a subscriber that speaks a certain language, or a subscriber with a specific question or comment. Based at least in part on the identification, the customer service center server 118 may determine what queue to place the call request. In some instances, the customer service center server 118 may send the call request to another customer service center server (not illustrated) having one or more queues configured to queue the call request. Once through the queue, a call service representative may be notified that the customer would like to speak with a call service representative.

Call placement system server 120 may connect a CSR to a customer by way of a customer's user device, such as user device 110. The process of connecting the CSR to a customer may vary. For example, once a call request goes through a queue in customer service center server 118, the customer service center server 118 may notify call placement system server 120 either directly or indirectly (e.g., via customer service center server 118) that a CSR is ready for a call. Call placement system server 120 may then initiate a call to the CSR that is ready for a call. The call placement system server 120 may also initiate a call to the customer's user device (e.g., user device 110) directly or indirectly (e.g., via network 112). The call to the customer's user device may be initiated after the CSR is connected to the call or while the call placement system server 120 is in the process of initiating the call to the CSR. In some examples, a call placed by the call placement system server 120 may occur using a landline, voice over Internet Protocol (VoIP), or some other mechanism.

The customer may receive (e.g., via user device 110) a call from the call placement system server 120 and may choose to accept or deny the call. Should the customer decline the call, the call may be ended. However, in some examples, when declining the call, the customer may request that the CSR call the customer at a different time or at a different number. Should the customer accept the call, the call placement system server 120 may connect the customer with the customer representative. The customer may communicate with the CSR until the customer or the CSR terminates the call. This allows the customer to request a call, and subsequently receive a call from a CSR without having to call a CSR or wait on a telephone until a CSR is available to assist the customer.

Connection server 114 may also communicate with outage tracking server 122. Outage tracking server 122 may receive information about signals received from set-top boxes such as set-top boxes 106, 108 via connection server 114 (and perhaps head end 104), process the received information, and determine outage statuses for one or more geographical regions associated with the received signals. These statuses can include indications of a degraded status, a partial outage, or a complete outage for a geographical region.

Outage tracking server 122 can also use connection server 114 to request information, such as received-signal information, from one or more particular set-top boxes, such as set-top boxes 106, 108. The set-top box(es) can provide the requested information in response to the specific request from a server, such as outage tracking server 122, at a pre-determined rate, such as one report every 30 minutes, one report of received-signal information per hour, three reports per day, etc. In some embodiments, outage tracking server 122 can use connection server 114 send request(s) to set-top box(es) to change the rate of reporting requested information; e.g., from one report per day to 3, 6, 12, or 24 reports per day (or vice versa).

Outage tracking server 122 can also use connection server 114 to provide information, such as outage-related information to one or more set-top boxes. For example, if outage tracking server 122 determines an outage is taking place in a particular geographical region; e.g., region R, then outage tracking server 122 can send a notice about the outage and information about the outage, such as possible causes for the outage, an estimated duration of the outage, etc., to one or more set-top boxes in region R. The set-top boxes in region R can receive the notices and provide those notices to set-top box customers, such as via a display generated by the set-top box on a display device, e.g., a television connected to the set-top box; by audible alerts, tones, and/or messages provided by the set-top box either directly or using the display device, and/or via visual indicators of the set-top box; e.g., light emitting diodes (LEDs), light bulbs, and/or liquid crystal display (LCD) elements.

II. Example Computing Device

Figure 2:
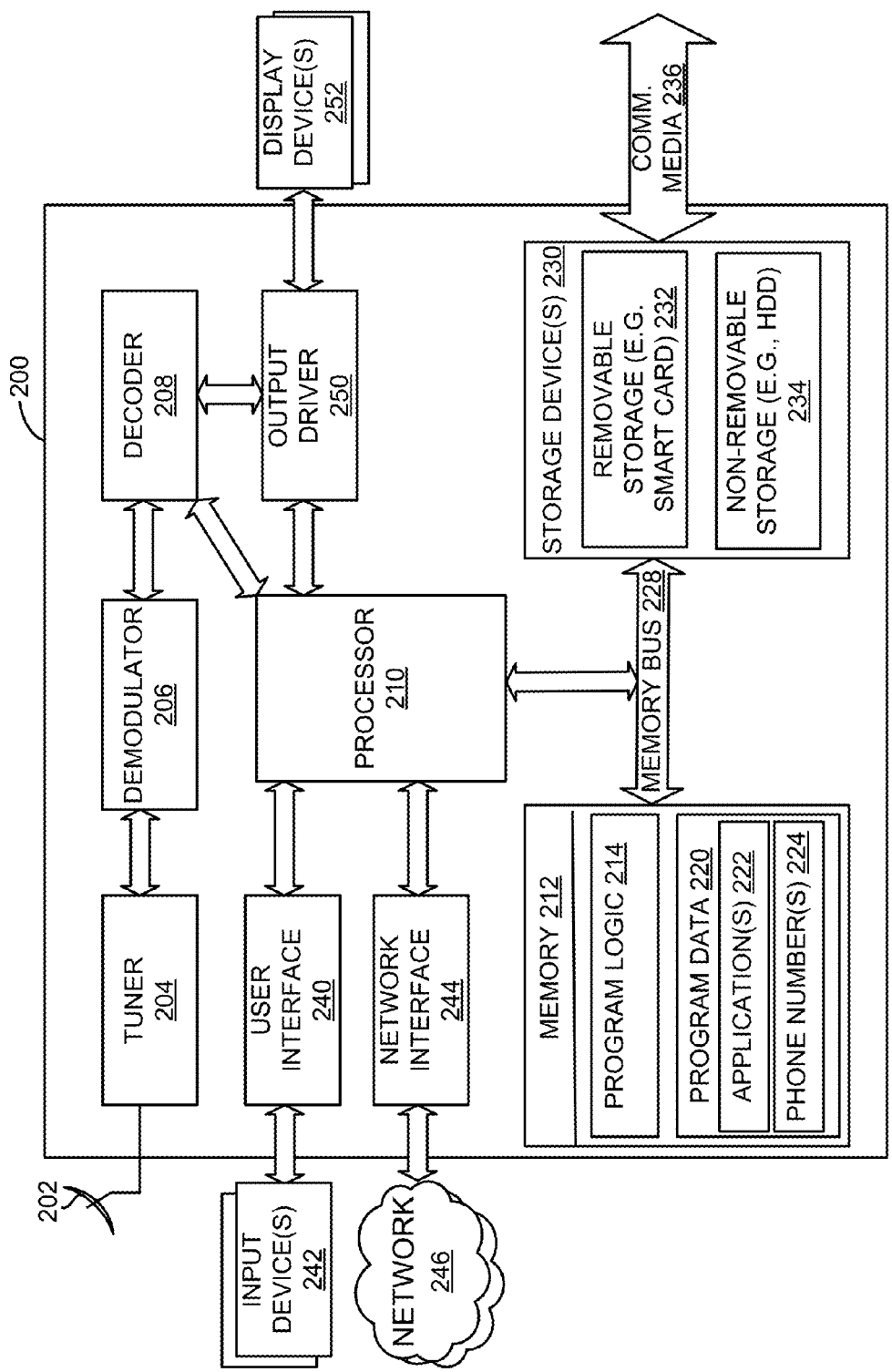
FIG. 2 is a functional block diagram that illustrates a computing device used in a communication system.

FIG. 2 is a functional block diagram that illustrates a computing device 200 used in a communication system in accordance with embodiments described herein. Computing device 200 may take a variety of forms. For example, computing device 200 may comprise or be arranged as a set-top box (such as set-top boxes 106, 108 of FIG. 1). The set-top box may be used for television or other media. As another example, computing device 200 may comprise or be arranged as a landline or cellular telephone, smartphone, personal computer, laptop computer, tablet computer, personal digital assistant (PDA), portable media player, or other computing device now known or later developed.

Computing device 200 may include an antenna 202, a tuner 204, a demodulator 206, a decoder 208, a processor 210, a memory 212, one or more storage devices 230, a user interface 240, a network interface 244, and an output driver 250. Although, a particular configuration of computing device 200 is illustrated, the configuration is merely representative of various possible receiving devices. For example, although only one tuner 204, one demodulator 206, and one decoder 208 are illustrated, multiple tuners, demodulators, or decoders may be provided within computing device 200. The components described in FIG. 2 may be communicatively linked by a system bus, network, or other connection mechanism.

Antenna 202 may be one of a number of different types of antennas that may include one or more low noise blocks (LNB) down-converters associated therewith. For instance, antenna 202 may be a single antenna for receiving signals from a satellite (such as satellite 102 of FIG. 1), network (such as network 112 of FIG. 1), or terrestrial source. In another instance, antenna 202 may include multiple antennas for different orbital slots. In yet another instance, signals and other items described as being received by antenna 202 can be received by network interface 244 by way of a coaxial cable or other communication link. In that regard, one or more signals or items received at network interface 244 can be forwarded to tuner 204.

Tuner 204 may receive a signal from antenna 202. The signal may be a media signal that may include video or audio signals. The signal may also include a television signal. The content of the signal may vary based on the type of signal. For example, the content may include television programming content, program guide data or other types of data. Tuner 204 may communicate the signal to demodulator 206.

Demodulator 206 may receive the signal and demodulate the signal to form a demodulated signal. Decoder 208 may decode the demodulated signal to form a decoded signal or decoded data. The decoded signal may be sent to processor 210 or output driver 250. However, other examples are also possible.

Processor 210 may be any type of one or more processors, such as a microprocessor, a microcontroller, a digital signal processor (DSP), central processing unit (CPU), graphics processing unit (GPU), multicore processor, etc. Processor 210 may be used to coordinate or control tuner 204, demodulator 206, decoder 208, and any other components of computing device 200 that may or may not be illustrated in FIG. 2. In some implementations, processor 210 may include an internal memory controller (not illustrated). Yet other implementations may include a separate memory controller that can be used with processor 210.

A memory bus 228 can be used for communicating between the processor 210 and memory 212. Memory 212 may be any suitable type of memory. For example, memory 212 may include a non-transitory computer-readable medium, for example, such as computer-readable media that stores data for short periods of time like solid-state memory, flash drives, register memory, processor cache and Random Access Memory (RAM). The computer-readable medium may also or alternatively include non-transitory media, such as secondary or persistent long-term storage, like read only memory (ROM), optical or magnetic disks, compact disc read only memory (CD-ROM), for example. The computer-readable medium may also be any other volatile or non-volatile storage system. The computer-readable medium may, for example, be considered a computer-readable storage medium or a tangible storage device.

Memory 212 may include program logic 214 and program data 220. Program logic 214 may include programming instructions, such as computer executable or logic-implemented instructions. In some examples, the programming instructions may be provided or otherwise obtainable in a downloadable format, such as via network 246 (which may be illustrated as network 112 in FIG. 1). Program data 220 may include program information that can be directed to various data types. For instance, program data 220 may include one or more applications 222 that may execute one or more algorithms arranged to provide input components of computing device 200, in accordance with the present disclosure. Program data 220 may also include data (such as phone numbers 224 or customer account information) that may be stored in memory 212 at computing device 200.

In some implementations, memory 212 may be distributed between one or more locations. For example, at least a portion of memory 212 may reside within processor 210. In another example, all or part of memory 212 may reside on a storage device 230. Storage device 230 may include removable storage devices, non-removable storage devices, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), memory cards, smart cards and tape drives to name a few. Computer storage media can include volatile and nonvolatile, transitory, non-transitory, removable and non-removable media implemented in any method or technology for storage of information, such as computer-readable instructions, data structures, program modules, or other data.

Computing device 200 may also include a user interface 240 that is configured to allow a customer to interact with computing device 200 via one or more input devices 242. Examples of input device 242 may include a remote control (or more simply, a remote), keyboard, a computer mouse, one or more push buttons, a touch screen, a smart phone, a tablet PC, a voice activated interface, or the like. Input device 242 may be used, for example, to select a channel, select information, change the volume, change the display appearance, or other functions using user interface 240. Input device 242 may also be used to select a phone number, a confirmation to request a call from a CSR, a time at which to schedule or reschedule a call, a cancellation of a call request, etc. The process of making a selection with input device 242 may take a variety of forms, such as an action by a customer. In some embodiments, user interface 240 can include devices for providing audible and/or visual indications; e.g., loudspeaker(s), LED(s), LCD screen(s), and/or light bulb(s).

Computing device 200 may include network interface 244 for communicating data through one or more networks 246. Network interface 244 may take a variety of forms. For example, network interface 244 may be a WiFi, WiMax, WiMax mobile, data over cable service interface specification (DOCSIS), wireless, cellular, or other types of interfaces. Moreover, network interface 244 may use a variety of protocols for communicating via the network 246. For instance, network interface 244 may communicate using Ethernet, a Transmission Control Protocol/Internet Protocol (TCP/IP), a hypertext transfer protocol (HTTP), or some other protocol.

Computing device 200 may be coupled to a display 252. Display 252 may be a television, monitor, or other device configured to display images. The images may be video, graphics, text, or any variety of other visual representations. In some examples, the display 252 may include an audio output, such as a loudspeaker, to generate sound waves from media signals received by display 252.

Display 252 may communicate with an output driver 250 within computing device 200 to facilitate communication between computing device 200 and display 252. In some implementations, output driver 250 may work in conjunction with a graphics processing unit (not illustrated), which can be configured to communicate with display device 252. Output driver 250 can communicate with display device 252 by a high-definition multiple interface (HDMI) cable, a coaxial cable, some other wired communication link, or wirelessly.

In some examples, computing device 200 may communicate directly or indirectly with one or more additional devices using a communication media 236. A communication connection is one example of a communication media 236. Communication media 236 may be embodied by computer-readable instructions, data structures, program modules, or other data in a modulated data signal, such as a carrier wave or other transport mechanism. The communication media 236 may also include wireless, optical, or other information delivery media. A modulated data signal can be a signal that has one or more of its characteristics set or changed in such a manner to encode information in the signal. By way of example, and not limitation, communication media 236 can include wired media such as a wired network or direct-wired connection, and wireless media such as acoustic, radio frequency (RF), infrared (IR) or other wireless media. The communication may include a cellular or cellular data connection, a satellite data connection, etc.

III. Example Server

Figure 3:
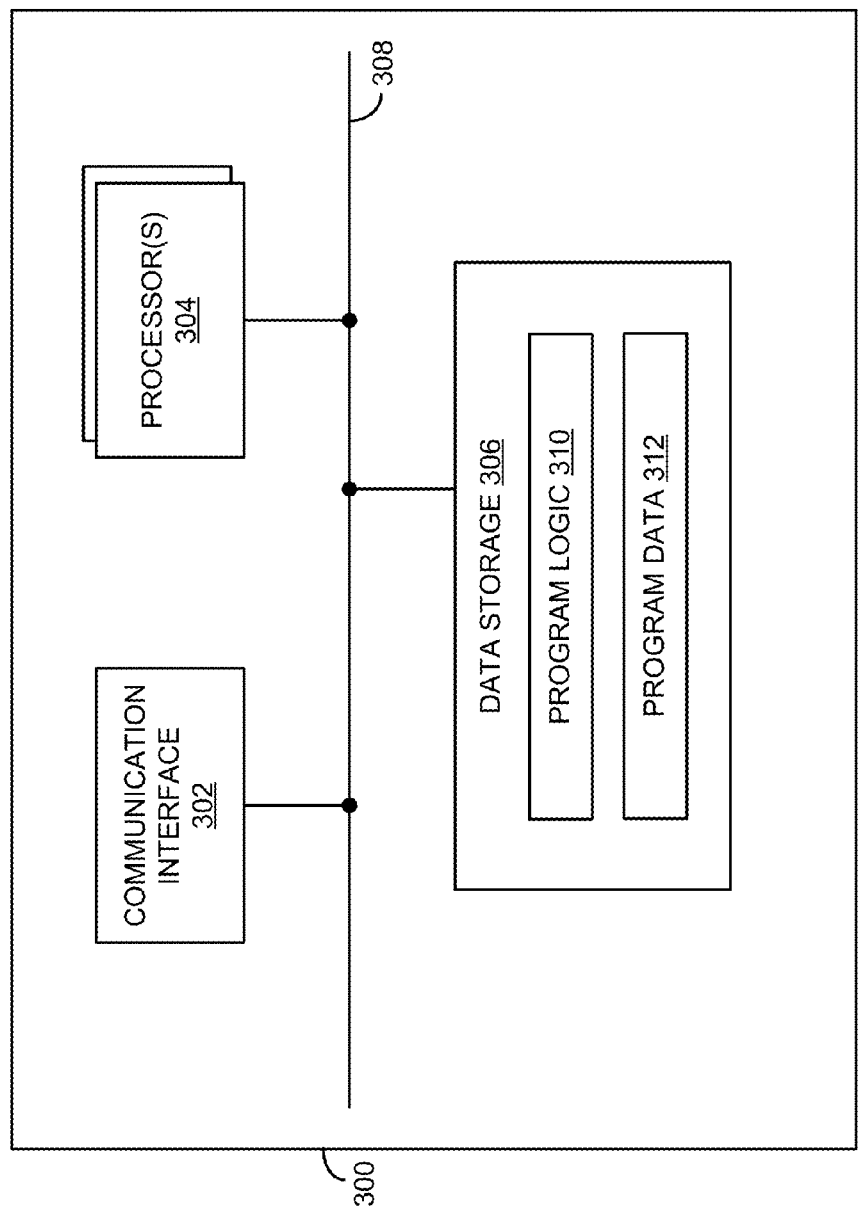
FIG. 3 is a functional block diagram that illustrates a server used in a communication system.

FIG. 3 is a functional block diagram that illustrates a server 300 used in a communication system in accordance with embodiments described herein. As shown, server 300 may include a communication interface 302, one or more processors 304, and a data storage 306, all of which may be communicatively linked together by a system bus, network, or one or more other connection mechanisms 308. Although not shown, server 300 may also include other components, such as external storage. It should also be understood that the configuration or functionality of server 300 may be distributed or subdivided between a plurality of entities, such as multiple servers. Further, it should be understood that some of the functions described herein may be carried out by an entity other than a server.

In server 300, the communication interface 302 may comprise one or more structures, and associated equipment, for receiving data from one or more sources and distributing data to a group of one or more destinations. For instance, communication interface 302 may be configured to receive a request from one or more entities (such as a set-top box) and add the request in a queue based on data associated with the request. The communication interface 302 may also be configured to provide for a communication to occur once the request is dequeued or otherwise processed.

Processor(s) 304 may comprise one or more processors, such as general-purpose processors (e.g., a microprocessor), special-purpose processors (e.g., graphics processing units (GPUs), application-specific integrated circuits (ASICs), or digital signal processors (DSPs)), programmable-logic devices (e.g., a field programmable gate array (FPGA)), or any other processor components now known or later developed. Processor(s) 304 may be integrated in whole or in part with other components of server 300.

Data storage 306 may be a non-transitory computer-readable medium. For example, data storage 306 may take the form of one or more volatile or non-volatile storage components, such as magnetic, optical, or organic storage components, integrated in whole or in part with a processor 306. As further shown, data storage 306 may include program logic 310 or program data 312. Program logic 310 may include, for example, machine language instructions executable by processor(s) 304 to carry out various functions, such as the functionality of the methods and systems described herein. Program data 312 may include one or more types of data deemed suitable for a given implementation. For example, program data 312 may include program information that can be directed to various data types (such as queues).

IV. Distributed Signal Verification Using Connected Set-Top Boxes

FIG. 4A shows an example set-top box 106 receiving signals 412, 416, and 420 from respective satellites 410, 414, and 418. Each of signals 412, 416, and 420 can include test signals (TSs) having one or more predefined patterns, and set-top box 106 can store reference pattern data 430 for reference patterns. Example predefined and reference patterns include, but are not limited to, patterns of frequencies, patterns of signal strengths, data patterns, patterns with added tones/noise, video patterns, text patterns, patterns of colors; e.g., color blocks, patterns of images, audio patterns, and combinations thereof.

In some embodiments, a satellite; e.g., satellite 410, 414, or 418, can transmit one predefined pattern, while in other embodiments, the satellite transmit multiple predefined patterns. In still other embodiments, a signal; e.g., signal 412, 416, or 420, can have one predefined pattern, while in even other embodiments, the signal can have multiple predefined patterns per signal.

Upon reception of test signals with one or more predefined patterns, set-top box 106 can determine the predefined pattern(s) from the received test signals, and compare the predefined pattern(s) with one or more reference patterns available from reference pattern data 430. Reference pattern data 430 can include data for one or more reference patterns—as shown in FIG. 4A, reference pattern data 430 can include data for reference pattern 1, data for reference pattern 2 . . . and data for reference pattern n. The data for a reference pattern 430 can include, but is not limited to, one or more copies of the reference pattern, data to reconstruct the reference pattern, information for obtaining a copy of the reference pattern; e.g., a uniform resource locator (URL), uniform resource indicator (URI), Internet Protocol (IP) address, dial-up phone number, and combinations thereof. Reference pattern data 430 can be preloaded on set-top box 106; e.g., during manufacture or installation, and/or can come from another computing device; e.g., a reference pattern or other server.

Then, after set-top box 106 obtains one or more reference patterns from reference pattern data 430, set-top box 106 can compare the predefined pattern(s) with one or more associated reference patterns associated with the predefined pattern(s) to determine information about the test signals, where the associated reference pattern(s) can be obtained from stored reference pattern data 430. The associated reference pattern can be determined based on pattern-identifying data including, but not limited to, the satellite that broadcast the predefined pattern(s), a channel of the satellite that conveyed the predefined pattern(s), a frequency associated with the predefined pattern(s), data within a test signal and/or the predefined pattern(s) e.g., a pattern identifier, and combinations of these pattern-identifying data.

For example, suppose that satellite 410 broadcast a predefined pattern PP1 as part of test signal 412. Upon reception of test signals 412, set-top box 106 can extract pattern PP1 from test signal 412, and compare PP1 to an associated reference pattern based on reference pattern data 430 stored by set-top box 106. The associated reference pattern can be determined based on pattern-identifying data related to PP1; e.g., satellite 410, a channel of satellite 410 that conveyed test signal 412, a frequency associated with test signal 412, data within test signal 412 and/or PP1, etc. In some embodiments, set-top box 106 can compare part or all of PP1 to part or all of multiple reference patterns related to reference pattern data 430 in order to determine that the associated reference pattern is a reference pattern of the multiple reference patterns that most closely matches PP1.

After obtaining the received predefined pattern(s) and determining the associated reference pattern(s) for the received predefined pattern(s) from reference pattern data 430, set-top box 106 can compare the received predefined pattern(s) to the associated reference pattern(s) to determine test results 440. To compare the received predefined pattern (s) to the associated reference pattern(s), set-top box 106 can compare patterns of frequencies, patterns of signal strengths, data patterns, patterns with added tones/noise, video patterns, text patterns, patterns of colors; e.g., color blocks, patterns of images, audio patterns, and combinations thereof, and obtain one or more test results 440.

One technique for comparing predefined pattern(s) to the associated reference pattern(s) can involve patterns of signal frequency and signal strength values. For example, set-top box 105 can tune to a test channel known to broadcast signals having predefined pattern(s) of frequencies and signal strengths, receive signals from the test channels, obtain the having predefined pattern(s) of frequencies and signal strengths from the signals, and compare the received predefined pattern(s) of frequencies and signal strengths against associated reference pattern(s) to ensure signal frequencies/strengths match within acceptable ranges.

Another technique for comparing predefined pattern(s) to the associated reference pattern(s) can involve analyzing predefined patterns of data sent from a satellite; e.g., satellite 410, 414 or 418, and/or a test image against reference data patterns and/or images. If the associated reference pattern includes one or more reference images, set-top box 106 can use an image analysis tool to compare received predefined image(s) with the reference image(s). A reference image can be, include, or be similar to test images, such as the Society of Motion Picture and Television Engineers (SMPTE) color bars image, high-definition (HD) SMPTE color bars, test patterns, and/or test cards such as the Philips PM5540, PM5544, or PM5644 test cards. The size of the pattern can vary in resolution; e.g. range in resolution from a 480p video resolution to a 1080p video resolution. Set-top box 106 can include software for receiving, obtaining, and comparing predefined pattern(s) to the associated reference pattern(s).

In one example, a predefined pattern PP2 is received as a 10 second audio signal of 60 Hertz (Hz) at −3 decibels (dB) superimposed on a 7005+/−4 Hz signal at −11.9+/−0.5 dB. Set-top box 106 can determine an associated reference pattern ARP2 with a 10 second audio signal of 60 Hertz (Hz) at −3 dB superimposed on a 7000 Hz signal at −12 dB. In comparing PP2 and ARP2, the lower frequency 60 Hz signal and power of −3 dB match exactly in both patterns, but the higher frequency signal differs in both frequency and power. However, the difference in frequency is less than 0.1% (the difference is at most 9 Hz of a 7000 Hz reference audio signal) and the difference in power is at most 0.6 dB, so set-top box 106 can indicate that PP2 and ARP2 have at least a 99.9% frequency match with a maximum power difference of 0.6 dB, and so can report these comparison quantities as test results 440, and perhaps qualitatively indicate that PP2 and ARP2 closely, but do not exactly, match.

As another example, a predefined pattern PP3 was received by set-top box 106 that included a 100 pixel×100 pixel image having four 50 pixel×50 pixel mono-colored patches arranged in two rows—the top row having a red patch having (Red, Green, Blue) (RGB) values of (255, 0, 0) and a green patch having RGB values of (0, 255, 0), and the bottom row having a blue patch with RGB values of (0, 0, 255) and a grey patch with RGB values of (126, 127, 128). Further suppose that associated reference pattern ARP3 is stored on set-top box 106 that has a 100×100 image having four 50 pixel×50 pixel mono-colored patches arranged in two rows—the top row having the same red and green patches as in PP3, and the bottom row having the same blue patch, but having a grey patch with RGB values of (128, 128, 128). In this example, 2,500 pixels differ between PP3 and ARP3 out of 10,000 pixels total, and so one test result could be that 25% of pixels in PP3 were in error. However, the average difference between R values of PP3 and ARP3 over the 10,000 pixels of the image is 0.5, the average difference between G values of PP3 and ARP3 over the 10,000 pixels is 0.25, and there is no difference between B values of PP3 and ARP3, and these average difference of color values could be part of test results 400. Further, these differences are less than 1 for all three colors, and so are unlikely to be visually distinct, indicating that PP3 and ARP3 closely, but do not exactly, match. Additional techniques, such as edge detection, determining and comparing regions of interest in images, filtering/resizing images, and other image processing techniques can be used to compare images as predefined patterns and reference patterns.

As another example, a predefined pattern PP4 is received by set-top box 106 that included a 44-bit bit stream that set-top box 106 determines to be associated with associated reference pattern ARP4 also having a 44-bit bit stream, with PP4 and ARP4 shown in Table 1:

TABLE 1

| PP4: | 0011 | 0011 | 0001 | 1100 | 0111 | 0000 | 1111 | 0000 | 1111 | 0101 | 0000 |
| ARP4: | 0111 | 0011 | 0001 | 1100 | 0111 | 0000 | 1111 | 0000 | 1111 | 0101 | 0101 |
| Diff: | 0X00 | 0000 | 0000 | 0000 | 0000 | 0000 | 0000 | 0000 | 0000 | 0000 | 0X0X |

Set-top box 106 can compare PP4 and ARP4 to obtain the "Diff" pattern, where a "0" in the Diff pattern indicates no difference at that bit position between PP4 and ARP4, and an "X" in the Diff pattern indicates a difference at that bit position between PP4 and ARP4. In this example, set-top box 106 can determine that 3 bits differ between the bit streams of PP4 and ARP4, which is a bit-error rate (BER) of 3/44=6.8% The bit-error rate can be compared to one or more threshold BERs to determine if PP4 and ARP4 match. In this example, the BER of 6.8% exceeds a maximum-acceptable bit error rate threshold and so set-top box 106 can determine that PP4 and ARP4 do not match, and provide information about PP4, ARP4, Diff, the determined bit-error rate, and the maximum-acceptable bit error rate threshold, and/or comparison results between the determined bit-error rate and the maximum-acceptable bit error rate threshold indicating PP4 and ARP4 do not match as part of test results 440.

Additional example test results 440 are shown in FIG. 4A, indicating a comparison of a predefined pattern received from satellite 410 with a reference pattern RP13 with a matching rate of 99%, and another comparison of a predefined pattern received from satellite 414 with a reference pattern RP07 with an error rate of 4 errors. Many other examples of comparing predefined patterns with reference patterns and corresponding test results are possible as well, including but not limited to, comparing combinations of different types of predefined patterns and reference patterns; e.g., comparing combinations of PP2, PP3, and PP4 to respective combinations of ARP2, ARP3, and ARP4, and corresponding test results.

Upon comparing received predefined patterns with stored reference patterns, set-top box 106 can generate output with patterns and/or test results including, but not limited to, messages, displays/images, audio outputs, and video outputs. FIG. 4B shows an example test result display 450 as one such output. Display 450 includes information about a test channel "Ch. 488881" used to convey test signals/predefined patterns, time and date information, and instructions on performing the test, such as an indication that "[t]esting will begin after tuning to this channel for more than 60 seconds or after pressing the <TEST> button on your remote or set-top box.

Display 450 also includes test reporting template 460, which can be used to report test results, such as test results 440. Test reporting template 460 includes an indication of a channel used for a test, a status of the test as either "Starting", "Running", or "Complete", and results. The results can include information about an input source, including a predefined pattern identifier "Pattern p" for the test, a satellite identifier "Satellite ddd", transponder identifier(s) "t1,[t2 . . . ]", set-top box information such as model number and stored reference pattern identifier "Reference Pattern rp", a time for when a comparison between predefined and reference patterns was performed, test result information; e.g., percentages correctly compares, error counts, test results such as "Pass" or "Fail", and test duration information. In some embodiments, test results 440 and/or display can include more, less, and/or different information than shown in FIG. 4A and/or than shown as part of test results template 460 of FIG. 4B.

Figure 5A:
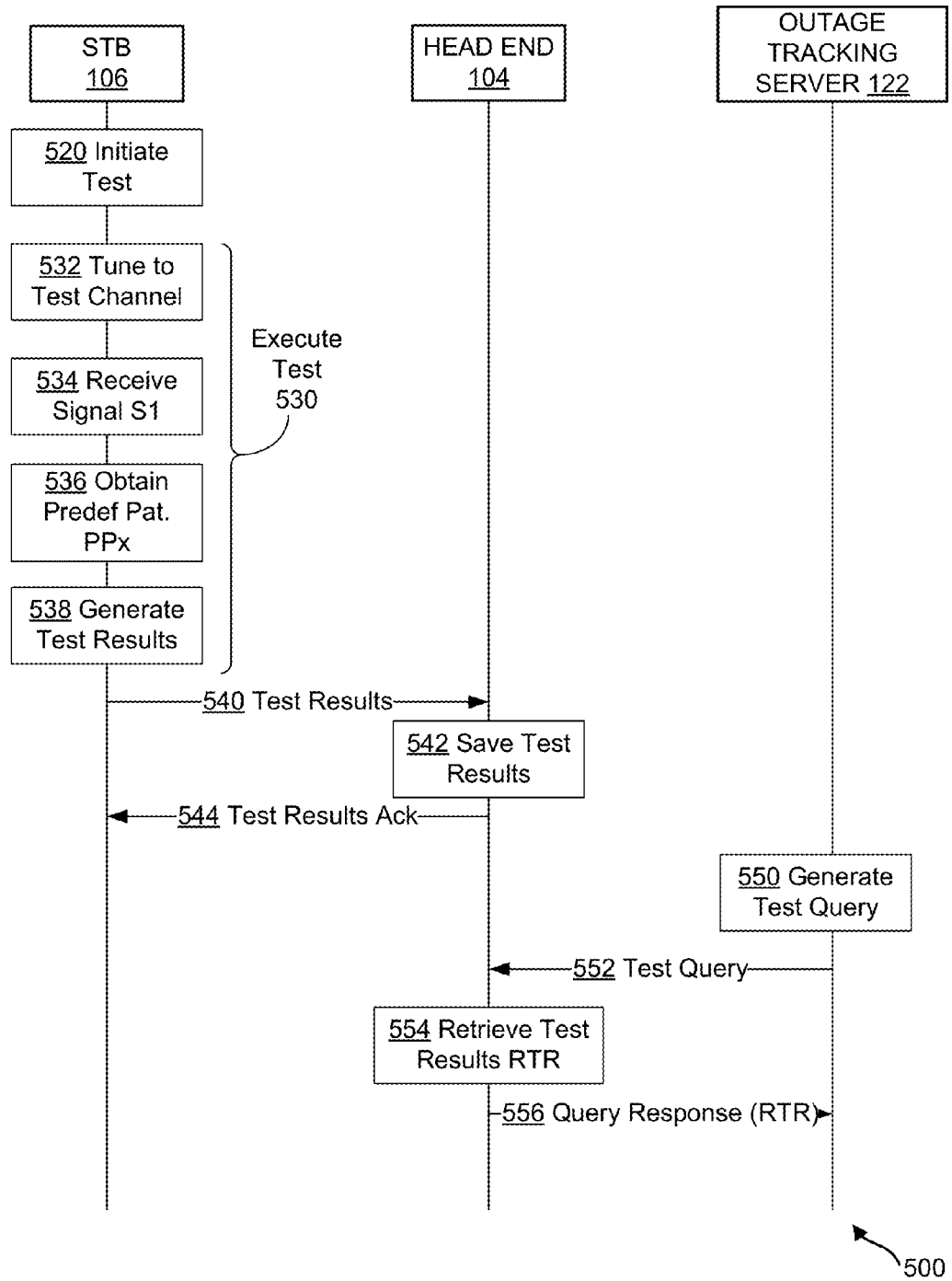
FIGS. 5A and 5B show an example scenario regarding communications between a set-top box, a head-end server, and an outage tracking server.
Figure 5B:
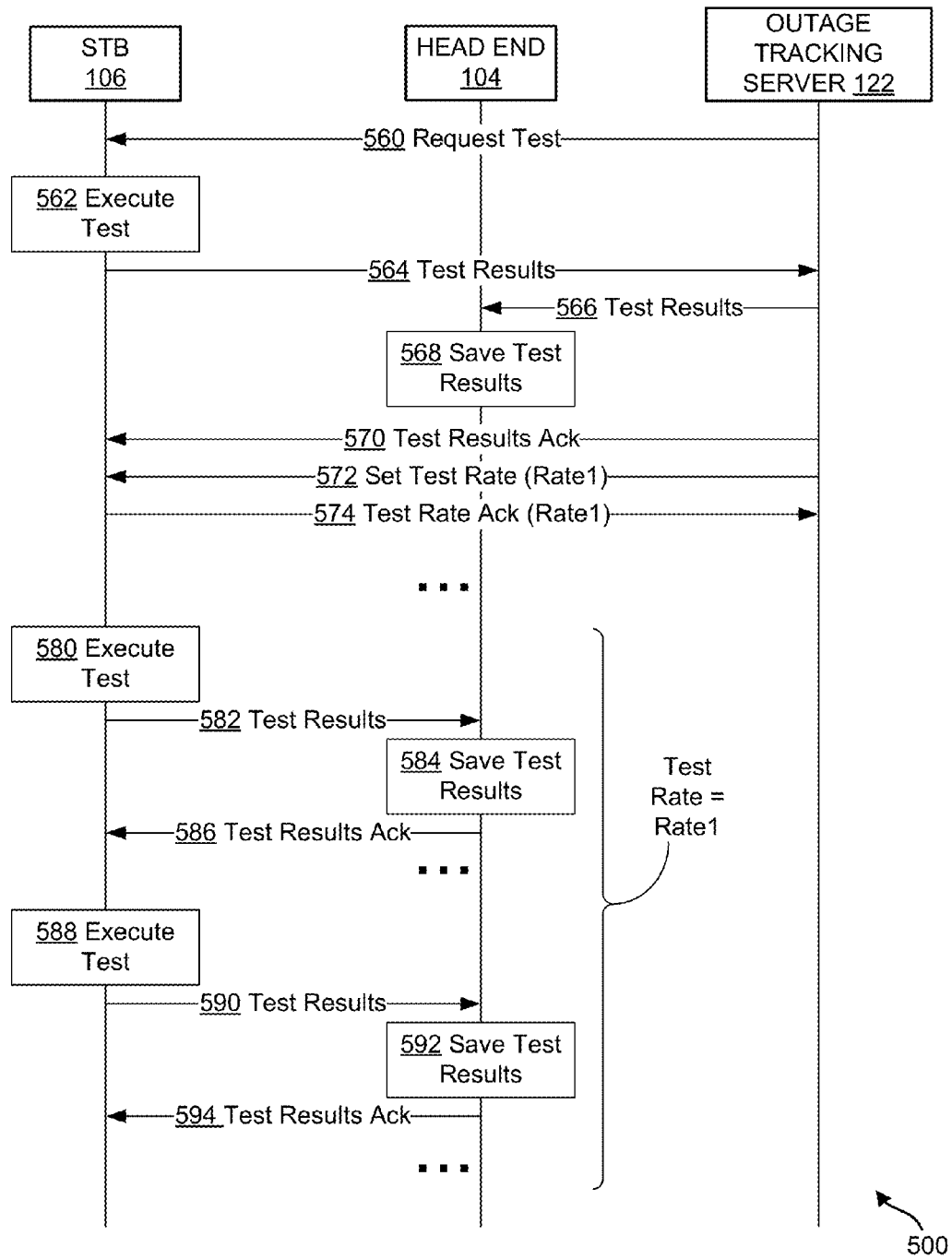

FIGS. 5A and 5B show example scenario 500 regarding communications between set-top box 106, head end 104, and outage tracking server 122. Scenario 500 begins at block 520 where set-top box (STB) 106 initiates test to compare one or more predefined patterns with one or more associated referenced patterns.

Then at test 530 of scenario 500, set-top box 106 executes test 530 by performing the procedures of at least blocks 532, 534, 536, and 538. At block 532, set-top box 106 tunes to a test channel. At block 534, set-top box 106 receives signals S1 from the test channel. At block 536, set-top box 106 obtains predefined pattern PPx—"Predef. Pat." as shown in FIG. 5A—from signals S1. At block 538, set-top box 106 retrieves an associated reference pattern ARPx from its memory that is associated with predefined pattern PPx, compares associated reference pattern ARPx with predefined pattern PPx, and generates test results based on a comparison between patterns ARPx and PPx.

The test results of block 538 (and other blocks) can include raw data; e.g., signals S1, predefined pattern PPx, and/or associated reference pattern ARPx, with or without comparison information for one test performed by set-top box 138, raw data and/or comparison information from multiple tests, summarized raw data and/or comparison information from one or more tests performed by set-top box 138; e.g., mean, median, mode, standard deviation, and count (N) values and/or other statistics about the one or more tests. Other types of test results are possible as well. In cases where test results of set-top box do not include comparison information, the procedures of block 538 can be excluded from test 530. In other cases where only signals S1 are included as test results, the procedures of blocks 536 and 538 can be excluded from test 530.

As shown in FIG. 5A, set-top box 106 generates and sends test results message 540 with the test results of block 538 to head end 104. Head end 104 receives test results message 540, obtains the test results of block 538 from test results message 540, and at block 542, stores the test results in a test result data base or other structure in the memory of head end 104. Head end 104 then sends test results acknowledgment (Ack) message 544 to set-top box 106 to indicate successful transmission of the test results of block 538 conveyed in test results message 540.

Scenario 500 progresses with outage tracking server 122 generating a test query at block 550 and sends test query message 552 with the test query to head end 504. Head end 104 receives test query message 552 and obtains the test query from test query message 552. At block 554, head end 104 uses the test query to retrieve some or all of the test results stored at head end 104 as retrieved test results RTR. At block 556, head end 104 then generates query response message 556 that includes retrieved test results RTR and sends query response message 556 to outage tracking server 122.

Later in scenario 500, as shown in FIG. 5B, outage tracking server 122 determines a use for test results from set-top box 106. Outage tracking server 122 generates and sends request test message 560 to set-top box 106. In some cases, request test message 560 can have information about the requested test to be executed; e.g., a test channel or other channel to be used in a test, information about one or more reference patterns to be used in the test.

Set-top box 106 can receive request test message 560, execute the requested test such as discussed above in the context of test 530 and blocks 532, 534, 536, and 538 of scenario 500, and so generate test results. Set-top box 106 can then generate and send test result message 564 with the generated test results of block 562 to outage tracking server 122, as outage tracking server 122 explicitly requested the test from set-top box 106.

Outage tracking server 122 can forward test results message 564 as test results message 566 to head end 104. In some scenarios, outage tracking server 122 can obtain the test results from test results message 564. After head end 104 receives test results message 566, head end 104 obtains the test results from test results message 566, and at block 568, stores the test results in the memory of head end 104. Outage tracking server 122 sends test results acknowledgment message 570 to set-top box 106 to indicate successful transmission of the test results.

Scenario 500 continues with outage tracking server 122 determining a particular rate Rate1 for automatically executing tests on set-top box 106. Rate1 can be expressed as a number of tests per minute, per hour, per day, per week, per month, per year, or based on some other span of time. Outage tracking server 122 then generates and sends set test rate message 572 that includes rate Rate1 to set-top box 106. In response to set test rate message 572, set-top box 106 can obtain rate Rate1 from set test rate message 572 and establish a test rate equal to Rate1 for executing tests. After establishing its test rate equal to Rate1, set-top box 106 can generate and send test rate acknowledgement message 574 including Rate1 to outage tracking server 122 to indicate that set-top box 106 has established a test rate equal to Rate1.

In other scenarios than scenario 500, outage tracking server 122 can specify automatic testing using data other than a requested test rate. For example, outage tracking server 122 can specify a list of one or more times per day, per week, per month, etc. requesting testing from set-top box 106; e.g., at 3 AM on Monday, Tuesday, Wednesday, Thursday, and Fridays, and 2 AM and 9 PM on Saturday and Sunday; at 9 AM, 12 AM, 2 PM, and 7 PM daily, at any time during each $7^{th}$ and $21^{st}$ day of the month.

In still other scenarios than scenario 500, outage tracking server 122 can initiate automatic testing at the requested test rate by sending request test messages, such as request test message 560, to the set-top box at the requested test rage. In these still other scenarios, set test rate message 572 and test rate acknowledgement message 574 may not be utilized.

As indicated in FIG. 5B, scenario 500 continues at block 580 with set-top box executing a test such as discussed above in the context of test 530 and blocks 532, 534, 536, and 538 of scenario 500, and so generating test results. Set-top box 106 can then generate and send test result message 582 with the generated test results of block 580 to head end 104. Head end 104 can receive test results message 582, can obtain the test results of block 580 from test results message 582, and at block 584, can store the test results in the memory of head end 104. Head end 104 then sends test results acknowledgment message 586 to set-top box 106 to indicate successful transmission of the test results of block 580 conveyed in test results message 582.

Scenario 500 continues at block 588 with set-top box again executing a test such as discussed above in the context of test 530 and blocks 532, 534, 536, and 538 of scenario 500, and so generating test results. Set-top box 106 can then generate and send test result message 590 with the generated test results of block 588 to head end 104. Head end 104 can receive test results message 590, can obtain the test results of block 588 from test results message 590, and at block 592, can store the test results in the memory of head end 104. Head end 104 then sends test results acknowledgment message 594 to set-top box 106 to indicate successful transmission of the test results of block 588 conveyed in test results message 590.

Set-top box 106 can execute tests, such tests of blocks 580 and 588 at a test rate equal to Rate1 as requested by outage tracking server 122 via set test rate message 572. In scenario 500, set-top box 106 continues to execute tests at a test rate of Rate1 until set-top box 106 is otherwise instructed. For example, in other scenarios than scenario 500, set-top box 106 can receive a message to stop testing or a set test rate message with a requested test rate other than Rate1—in some embodiments, a set test rate message can have a test rate, such as 0 or −1, indicating that set-top box 106 is to stop automatic testing. Automatic testing and manual testing, such as requested via request test message 560, via a user interface to set-top box 106, or via other means, can take place simultaneously; e.g., if the test rate for automatic testing is 1 test per day that is run at 4 PM on day D1 and a manual test is requested at 10 PM on D1, then the next automatic test can be run at 4 PM on day D1+1.

In other scenarios than scenario 500, the functionality of head end 104 and outage tracking server can be merged; e.g., outage tracking server 122 can store a data base or other structure of test results from set-top boxes, such as set-top box 106. In still other scenarios than scenario 500, set-top box 106 can store a data base or other data structure of its own test results. In these still other scenarios, a test query, such as test query 552, can be forwarded on from head end 104 to a set-top box, which can then retrieve test results from its data base of test results, and send a query response with the retrieved test results. In even other scenarios than scenario 500, head-end 104 can set testing rates for and/or request test results from set-top box 106. Other variations on scenario 500 are possible as well.

V. Determining Outages in Geographical Regions

Figure 6A:
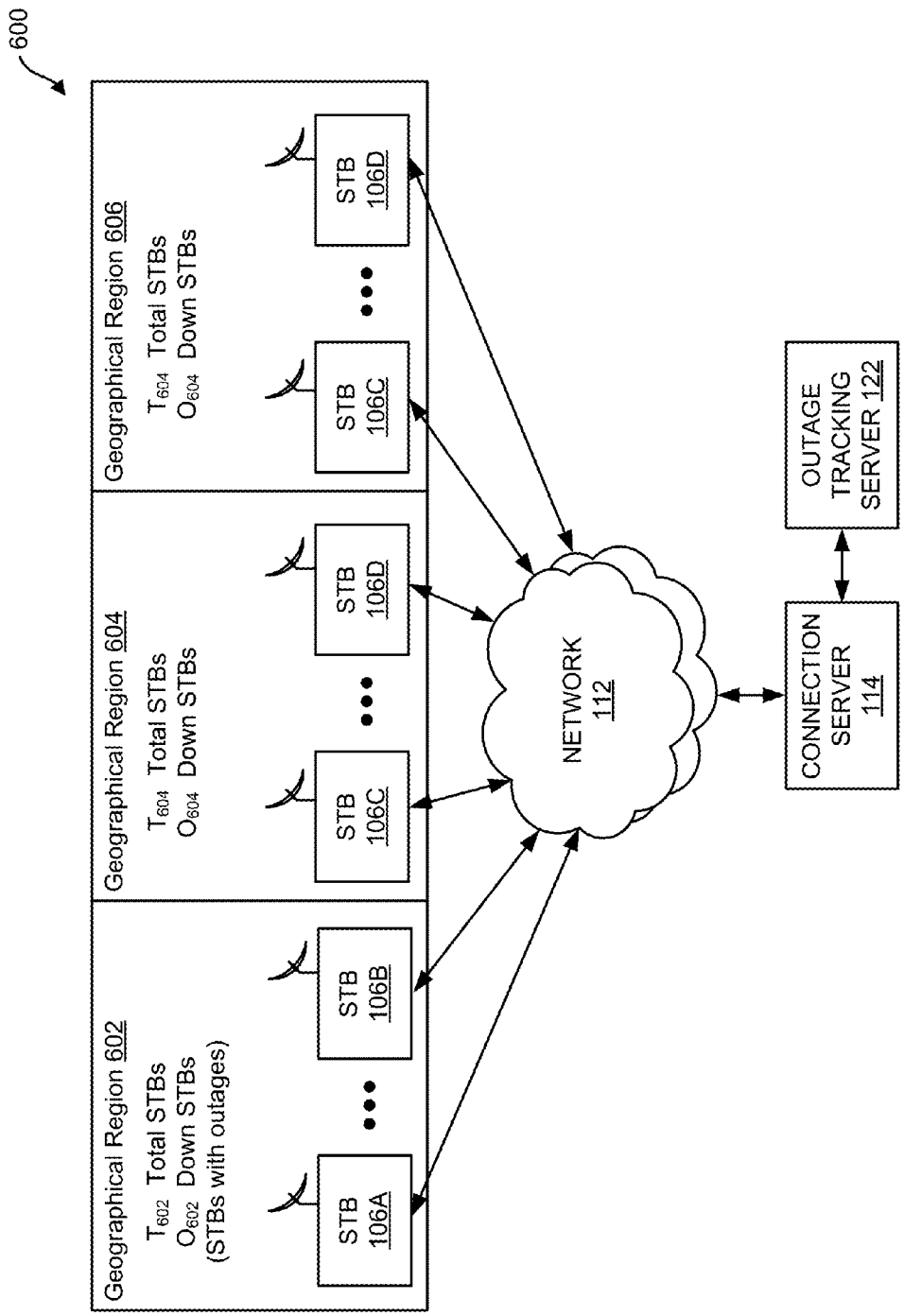
FIG. 6A illustrates a network for a scenario.

FIG. 6A illustrates a network for scenario 600. The network of FIG. 6A is related to the network of FIG. 1, as the network of FIG. 6A includes outage tracking server 122, connection server 114, and set-top boxes interconnected by network 112, each as discussed above in the context of FIG. 1. The set-top boxes shown in FIG. 6A are located in at three geographic regions 602, 604, 606. A first plurality of set-top boxes, represented by set-top boxes 106A . . . 106B are in geographical region 602. FIG. 6A indicates that, in scenario 600, a total number $T_{602}$ of set-top boxes are in geographical region 602, and among those $T_{602}$ set-top boxes, a number $O_{602}$ of set-top boxes in geographical region 602 are currently "down" or undergoing an outage, where $T_{602}>1$, and $T_{602} \geq O_{602}$. This implies that $T_{602}-O_{602}$ set-top boxes are currently "up" or not undergoing an outage. In scenario 600, a set-top box is either up or down—in other scenarios, a set-top box can have other statuses beyond up or down; e.g., partially up, not receiving a particular satellite, having a network delay, etc.

FIG. 6A also shows that a second plurality of set-top boxes, represented by set-top boxes 106C, . . . , 106D are in geographical region 604. In scenario 600, a total number $T_{604}$ of set-top boxes are in geographical region 604 among which a number $O_{604}$ of set-top boxes are currently down in geographical region 604, where $T_{604}>1$, and $T_{604} \geq O_{604}$. Additionally, FIG. 6A shows a third plurality of set-top boxes, represented by set-top boxes 106E . . . 106F are in geographical region 606. In scenario 600, a total number $T_{606}$ of set-top boxes are in geographical region 606, among which a number $O_{606}$ of set-top boxes are currently down in geographical region 606, where $T_{606}>1$, and $T_{606} \geq O_{606}$.

Figures 6B, 6C:
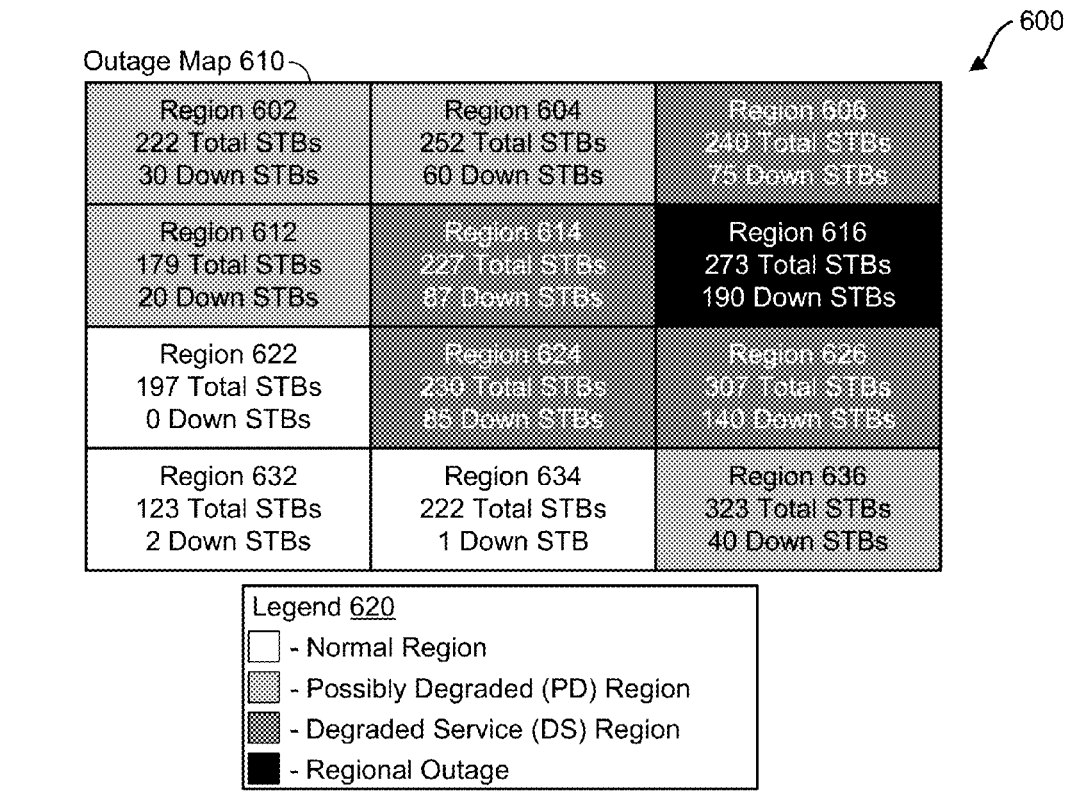
FIG. 6B shows an example outage map and example outage report for the scenario of FIG. 6A.
FIG. 6C depicts an example action plan for the scenario of FIG. 6A.

FIG. 6B shows an example outage map 610 and example outage report 630 generated by outage tracking server 122 as part of scenario 600. In scenario 600, outage tracking server 122 is configured to communicate with set-top boxes in at least twelve geographical regions: geographical regions 602, 604, and 606, as shown in FIG. 6A, as well as geographical regions 612, 614, 616, 622, 624, 626, 632, 634, and 636 shown in outage map 620. Outage tracking server 122 can determine total numbers of set-top boxes and numbers of down set-top boxes in each region, such as indicated in outage map 610.

Outage map 610 shows each of the twelve geographical regions mentioned above, along with total set-top box and down set-top box numbers for each region. Outage tracking server 122 can receive signal-reception-related information from set-top boxes and other sources and determine a geographical region and outage-status value from the signal-reception-related information. For example, outage tracking server 122 can receive test results related to signals received by set-top boxes, where the test results as discussed above in the context of at least FIGS. 4A-5B. As another example, outage tracking server 122 can receive signal strength values of signals received from set-top boxes. As yet another example, outage tracking server 122 can receive information about outages of set-top boxes from call centers, such customer service center 118 of FIG. 1. Many other examples of outage tracking server 122 receiving signal-reception-related information are possible as well.

The signal-reception-related information and/or a message carrying signal-reception-related information can include location and/or other information for determining a geographical region associated with the set-top box providing the signal-reception-related information. Example location and/or other information include, but are not limited to, geographical region identifiers, a ZIP or postal code associated with the set-top box, latitude/longitude values for the set-top box, an identifier of the set-top box, such as a serial number, that can be used to identify and then locate a particular set-top box, geolocation based on a network address, such as an Internet Protocol (IP) address, and a billing code or identifier that is associated with a location of the set-top box.

The outage-status value associated with the particular region can be the number of set-top boxes currently down in the geographical region; e.g., the $O_{602}$ number for geographical region 602. The number of set-top boxes currently down value can be incremented when a previously-up set-top box provides signal-reception-related information indicating that the previously-up set-top box is now down. Also, the number of set-top boxes currently down value can be decremented when a previously-down set-top box provides signal-reception-related information indicating that the previously-down set-top box is now up.

In some cases, data from each set-top box in a geographic region is provided at least once in a given time period; e.g., once a week, once a day, once every eight hours, once every hour. Then, if data is not received from a previously-up set-top box within the given time period, then the number of set-top boxes currently down value can be incremented, as a box not providing the requested data within the given time period can be considered to be down. However, the converse may not be true—a set-top box may be unable to receive signals from satellites, and so be classified as down, but still able to provide "heartbeat" or other data within the given time period.

In other cases, data from a set-top box can be provided based on one or more characteristics of received signals. For example, data from the set-top box can be reported if a signal quality, signal strength, or other characteristic(s) drops below one or more respective thresholds of signal quality, signal strength, or characteristic(s).

In other cases, outage tracking server 122 can send a message to a particular set-top box that is assumed to be up, where the message requests a response from the particular set-top box, such as test request message 560 of scenario 500. If outage tracking server 122 does not receive a response to the message from the particular set-top box within a predetermined amount of time; e.g., five seconds, 15 seconds, one minute, five minutes, then outage tracking server 122 can assume the particular set-top box is now down (perhaps after one or a few repeated attempts to get a response from the particular set-top box) and accordingly increment the number of set-top boxes currently down value.

In still other cases, outage tracking server 122 can send a message to a selected set-top box that is assumed to be down, where the message requests signal-reception-related information from the selected set-top box, such as test request message 560 of scenario 500. If outage tracking server 122 receives a response to the message from the selected set-top box and the received signal-reception-related information in the response indicates that the selected set-top box is now up, then outage tracking server 122 can assume the particular set-top box is now up and accordingly decrement the number of set-top boxes currently down value. Other techniques can be used to determine whether a set-top box is up or down and accordingly update the number of set-top boxes currently down value.

The outage-status value can include lists of set-top box identifiers. A "down list" can be a list or other data structure of identifiers of down set-top boxes in a particular geographical region maintained by outage tracking server 122. Outage tracking server 122 can use the down list to verify a current value of the total number of set-top boxes in the particular region, to verify a current value of the number of set-top boxes currently down in the particular region, to identify specific set-top boxes as down in the particular region, and for perhaps other reasons.

Outage tracking server 122 can also maintain an "up list", which is a list or other data structure of identifiers of up set-top boxes in the particular geographical region. Outage tracking server 122 can use the up list to verify a current value of the total number of set-top boxes in the particular region, to verify a current value of the numbers of set-top boxes currently down in the particular region, to identify specific set-top boxes as up in the particular region, and for perhaps other reasons. Then, when the number of set-top boxes currently down value is incremented, an identifier of the previously-up set-top box can be moved from the up list to the down list. Also, when the number of set-top boxes currently down value is decremented, an identifier of the previously-down set-top box can be moved from the down list to the up list.

In some cases, the outage-status value can also include the total number of set-top boxes in the geographical region; e.g., the $T_{602}$ number for geographical region 602. For example, if a set-top box is providing information to outage tracking server 122 for a first time, then outage tracking server 122 can update the total number of set-top boxes for a geographical region to indicate a new set-top box has been observed in the geographical region.

Outage tracking server 122 can use total number of set-top boxes and number of set-top boxes currently down values for a particular geographical region to determine an outage status for the particular region. In scenario 600, four outage statuses for geographical regions are used: normal, possibly degraded, degraded service, and regional outage. A normal region is a geographical region that is assumed to be up—set-top boxes down in this region are assumed to be down due to box-specific regions; e.g., hardware issues for a specific set-top box, local power failure, billing issues, etc. A possibly degraded region is assumed to be generally up but enough set-top boxes are down to indicate a possible region-wide outage. A degraded service region is assumed to be at least marginally up but more than enough set-top boxes are down to indicate a possible region-wide outage. A region with a regional outage status is assumed is generally down due to a region-wide outage but may have some set-top boxes still up.

In scenario 600, outage tracking server 122 utilizes a color scheme indicated by legend 620 for depicting regions in outage map 610 based on the four above-mentioned outage statuses. A white-colored region in outage map 610 depicts a normal geographical region such as region 632, a relatively-light grey region in outage map 610 depicts a possibly degraded region, a relatively-dark grey region in outage map 610 depicts a degraded service region, and a black region in outage map 610 depicts a region having a regional outage. Other color schemes, and other types of graphical representation can be used to depict regions based on outage status in an outage map, such as outage map 610

Outage tracking server 122 can use the total number of set-top boxes and number of set-top boxes currently down values for a particular geographical region to determine an outage ratio for the particular geographical region. For example, let $T_r$ be the total number of set-top boxes for geographical region r and let $O_r$ be the number of set-top boxes currently down. Then, the outage ratio for geographical region r can be determined as $OR_r = O_r/T_r$. As $O_r \leq T_r$ and $T_r \geq 1$, then $0 \leq OR_r \leq 1$, or expressed as an outage-ratio percentage $0\% \leq OR_r \leq 100\%$.

One or more outage-status thresholds can be used to determine outage statuses for geographical regions. Table 2 shows outage-status thresholds of outage-ratio percentages used in scenario 600 expressed to one decimal point. Other thresholds are possible as well; e.g., upper and lower thresholds can be used; e.g., a normal outage status can have a lower outage-ratio-percentage threshold of 0.0% and an upper outage-ratio-percentage threshold of 9.9%; an outage status of regional outage can have a lower outage-ratio-percentage threshold of 50.0% and an upper outage-ratio-percentage threshold of 100.0% (or higher).

TABLE 2

| Outage Status | Outage-Ratio-Percentage Threshold |
| --- | --- |
| Normal | 9.9% (or lower) |
| Possibly Degraded | 24.9% |
| Degraded | 49.9% |
| Regional Outage | Above 49.9% |

As an example of a normal region, FIG. 6B shows that region 634 has 1 down set-top box out of a total of 222 set-top boxes. Then, outage status server 122 can determine that the outage-ratio percentage for region 634 is 1/222*100%=0.5%, which is less than the outage-ratio-percentage threshold of 9.9% of a normal outage status, and so classify region 634 as a normal region. As an example of possibly degraded region, region 604 has 60 down set-top boxes out of a total of 252 set-top boxes. Then, outage status server 122 can determine that the outage-ratio percentage for region 604 is 60/252*100%=23.8%, which is above the outage-ratio-percentage threshold of 9.9% for a normal outage status and below the outage-ratio-percentage threshold of 24.9% for a possibly degraded outage status, and so classify region 604 as a possibly degraded region.

As an example of a degraded service region, FIG. 6B shows that region 626 has 140 down set-top boxes out of a total of 307 set-top boxes. Then, outage status server 122 can determine that the outage-ratio percentage for region 626 is 140/307*100%=45.6%, which is above the outage-ratio-percentage threshold of 24.9% for a possibly degraded outage status and below the outage-ratio-percentage threshold of 49.9% for a degraded service outage status, and so classify region 626 as a degraded service region. As an example of an outage status of regional outage, region 616 has 190 down set-top boxes out of a total of 273 set-top boxes. Then, outage status server 122 can determine that the outage-ratio percentage for region 616 is 190/273*100%=69.6%, which is in the "above 49.9%" range for a regional outage, and so classify region 616 as having an outage status of regional outage.

Outage report 630 is another representation of outage-related data generated by outage tracking server 122 in scenario 600. FIG. 6B shows that outage report 630 has six columns, in two groups of three, where the leftmost group of three columns includes outage-related data for geographical regions 602, 604, 606, 612, 614, and 616 and the rightmost group of three columns includes outage-related data for geographical regions 622, 624, 626, 632, 634, and 636.

Each group of three columns includes a "Reg." or region column heading, a "Status" or outage status column heading, and a "Down/Total/ORP" column heading for number of set-top boxes currently down, total number of set-top boxes, and outage-ratio-percentage (ORP) values. For example, after the column headings, the top row of the leftmost group of three columns has the following data "602 Poss. Deg. 30/222/13.5%", where "602" is a geographical region number, "Poss. Deg." indicates that the geographical region; e.g., region 602, has an outage status of possibly degraded, a value "30" for the number of set-top boxes currently down in geographic region 602, a value "222" for the total number of set-top boxes in geographic region 602, and a value "13.5%" for the outage-ratio percentage for geographic region 602. The data in outage report 630 for geographic region 602 is shown in an italic font to graphically indicate that the geographic region is possibly degraded. In FIG. 6A, data in outage report 630 without emphasis (that is, in a non-bold and non-italic font) for a geographic region graphically indicates that the geographic region is a normal region, data in outage report 630 in a bold font for a geographic region graphically indicates that the geographic region is a degraded service region, and data in outage report 630 in a bold and italic font for a geographic region graphically indicates that the geographic region is in a regional outage. Other graphical techniques; e.g., different colors, fonts, type sizes, etc., can be used to distinguish geographical regions of different outage statues in outage report 630.

FIG. 6C depicts an example action plan 640 for scenario 600. After determining an outage status for a geographic region, outage tracking server 122 can take action based on the outage status. Action plan 640 summarizes possible actions outage tracking server 122 can perform based on outage status. For example, if a geographic region RN has a normal outage status, outage tracking server 122 can conduct automatic testing of set-top boxes in region RN at a standard testing rate as indicated in action plan 640.

As another example, if a geographic region RPD has a possibly degraded outage status, outage tracking server 122 can conduct automatic testing of set-top boxes in region RPD at an enhanced testing rate as indicated in action plan 640, where the enhanced testing rate can be a testing rate that is more frequent than the standard testing rate; e.g., if the standard testing rate is four tests per day, then the enhanced testing rate can be eight tests per day, one test per hour, etc. The enhanced testing rate can be used to obtain more up-to-date information about the status of signal reception from set-top boxes in region RPD. Action plan 640 also indicates that outage tracking server 122 can warn customers in region RPD about the possibly degraded outage status; e.g., outage tracking server 122 can instruct set-top boxes in the region to display a message indicating that the geographic region may be experiencing an outage, as well as any other information available about the possible outage, such as duration, cause, and instructions to customers on what they should or should not do during the possible outage.

In addition to (or perhaps rather than) using an enhanced testing rate, an enhanced testing program can be used. The enhanced testing program can include expanded testing to determine cause of degradation, such as, but not limited to, tests associated with a built in self-test (BIST) set of tests for a particular set-top box.

As another example, if a geographic region RDS has a degraded service outage status, outage tracking server 122 can conduct automatic testing of set-top boxes in region RDS at an reduced rate as indicated in action plan 640, where the reduced testing rate can be a testing rate that is less frequent than the standard testing rate. The reduced testing rate can be used when outage tracking server 122 can be considered to have enough information to be reasonably certain about at least a partial outage, and so can reduce testing to reduce network and set-top box load. Action plan 640 also indicates that outage tracking server 122 can warn customers in the region RDS about the degraded service outage status in region RDS.

As another example, if a geographic region RRO has an outage status of regional outage, outage tracking server 122 can conduct automatic testing of set-top boxes in region RRO at a reduced rate as indicated in action plan 640. Action plan 640 also indicates that outage tracking server 122 can warn customers in the region RRO about the regional outage, and that technical, maintenance, and/or other support can be requested to assist customers in region RRO. Many other action plans are possible as well.

Figure 7:
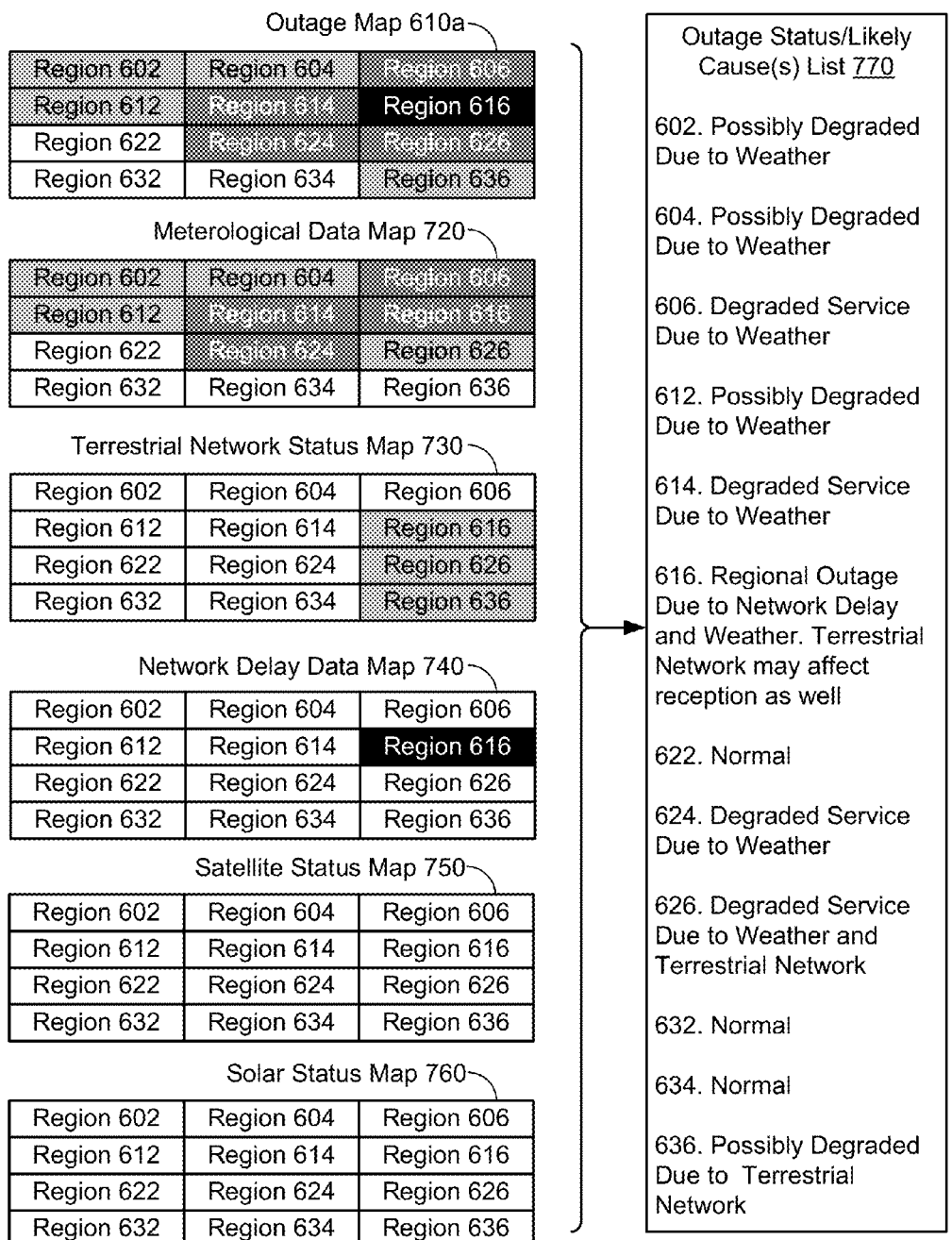
FIG. 7 shows example cause maps and list of outage statuses and causes for the scenario of FIG. 6A.

FIG. 7 shows example cause maps 720, 730, 740, 750, 760 and list of outage statuses and causes 770 for scenario 600. Scenario 600 continues with outage tracking server 122 determining possible/likely causes for outage statuses in geographical regions 602, 604, 606, 612, 614, 616, 622, 624, 626, 632, 634, and 636. Outage map 610a of FIG. 7 is a simplified representation of outage map 610 of FIG. 6B, where outage map 610a provides region number and outage status information using the color scheme indicated by legend 620 of FIG. 6B. For example, at upper-left of outage map 610, a cell having a relatively-light grey background is shown with number "Region 602" to indicate geographic region 602 has possibly degraded outage status in accord with outage map 610, legend 620, and outage report 630.

A similar color scheme of legend 620 is used in maps 720-760 of FIG. 7. In maps 720, 730, 740, 750, and 760, a white background color in a cell of the map indicates little or no effect on signal reception due to causes associated with the map in a geographical region represented by the cell, a relatively-light grey background color in the cell indicates some likely effect on signal reception due to causes associated with the map in the geographical region represented by the cell, a relatively-light dark background color in the cell indicates a possibly disruptive effect on signal reception due to causes associated with the map in the geographical region represented by the cell, and a black background color in the cell indicates a likely disruptive effect on signal reception due to causes associated with the map in the geographical region represented by the cell.

In scenario 600, map 720 is associated with causes that can degrade or disrupt on signal reception due to meteorological conditions (e.g., precipitation, cloud cover, wind, thunder, lightning), map 730 is associated with causes that can degrade or disrupt on signal reception due to terrestrial networks (e.g., telephone networks, the Internet), map 740 is associated with causes that can degrade or disrupt on signal reception due to network delay, map 750 is associated with causes that can degrade or disrupt on signal reception due to satellite status, and map 760 is associated with causes that can degrade or disrupt on signal reception due to solar status (e.g., solar storms, sun spots). Other causes are possible as well, and other representations of effects on signal reception than maps 610, 610a, and 720-760 are possible as well.

Outage tracking server 122 can take data used to make up and/or as indicated in maps 720-760 to determine one or more causes related to non-normal outage statuses in geographic regions 602, 604, 606, 612, 614, 616, 622, 624, 626, 632, 634, and 636. For example, the raw data represented by respective maps 720, 730, 740, 750, and 760 regarding meteorological conditions, terrestrial network conditions, network delay conditions, satellite conditions, and solar conditions, as well as other data, can be used to determine the one or more causes. As another example, data for each cause can be translated into effect on signal-reception statuses, such as indicated in discussing the color scheme of legend 620 with respect to maps 720-760.

For example, in scenario 600, raw data for a cause is converted into one of four signal-reception statuses: little or no effect on signal reception, likely effect on signal reception, possibly disruptive effect on signal reception, and likely disruptive effect on signal reception. As discussed above, these signal-reception statuses are mapped on to the color scheme of legend 620 as part of generating maps 720-760. These signal-reception statuses could also be assigned numerical values; e.g., 0 for little or no effect on signal reception, 1 for a likely effect on signal reception, 2 for a possibly disruptive effect on signal reception, and 3 for a likely disruptive effect on signal reception. Other numerical values and/or signal-reception statuses are possible as well.

The numerical values of signal-reception statuses could be compared on a per-geographical-region basis to determine likely causes of non-normal outage statuses for a region. For example, outage status values can be assigned numerical values that are similar to the numerical values assigned to signal-reception statuses; e.g., 0 for a normal outage status, 1 for a possibly degraded outage status, 2 for a degraded service outage status, and 3 for an outage status of regional outage.

Raw data, outage status values and/or signal-reception statuses used to generate outage maps and cause maps for geographical regions can be represented by matrices. For example, outage map 610 (or 610a) can be represented by outage tracking server 122 as a matrix of numerical values MOS assigned to outage status values; e.g., $$MOS = \begin{bmatrix} 1 & 1 & 2 \\ 1 & 2 & 3 \\ 0 & 2 & 2 \\ 0 & 0 & 1 \end{bmatrix},$$

where each cell of MOS represents an outage status value of a geographical region using the same 4×3 grid of regions as indicated in outage map 610 or 610a.

Similar matrices for cause maps can be generated by outage tracking server 122. For examples, a matrix MMC of signal-reception statuses indicated by meteorological data map 720 for scenario 600 can be determined as $$MMC = \begin{bmatrix} 1 & 1 & 2 \\ 1 & 2 & 2 \\ 0 & 2 & 1 \\ 0 & 0 & 0 \end{bmatrix}$$

and a matrix MTN of signal-reception statuses indicated by terrestrial network status map 730 for scenario 600 as $$MTN = \begin{bmatrix} 0 & 0 & 0 \\ 0 & 0 & 1 \\ 0 & 0 & 1 \\ 0 & 0 & 1 \end{bmatrix}.$$

In scenario 600, similar matrices of signal-reception statuses are generated by generated by outage tracking server 122 for network delay data map 740, satellite status map 750, and solar status map 760. In scenario 630, each of outage maps 610, 610a, and cause maps 720, 730, 740, 750, 760 use the same 4×3 grid to represent geographical regions and therefore matrices MOS, MMC, MTN, etc. of outage statuses can be 4×3 matrices to represent geographical regions. Then, by using the same grid/matrix structure for matrices MOS, MMC, MTN, etc., a given row-column coordinate pair can represent the same geographic region in all of the matrixes; e.g., the cell at row 3, column 2 or matrix coordinates (3, 2) of matrix MOS represents an outage status of geographical region 624, and similarly the (3, 2) cells of matrices MMC, MTN, etc. represent signal-reception statuses of geographical region 624. As such, matrices MOS, MMC, MTN, etc. can be considered to be aligned, as a row/column coordinate pair represents information for the same geographic region in all of the matrices Outage tracking server 122 can use the following example pseudo-coded algorithm shown in Table 3 for using aligned matrices with numerical values of outage status and signal-reception statuses to an outage status/likely causes list, such as outage status/likely causes list 770.

TABLE 3

1. FOR each row value R = 1, 2. ... in outage status matrix MOS
   2. FOR each column value C = 1, 2, ... in outage status matrix MOS
      3. IF MOS[R, C] = 0, output that the status of the geographic region represented by coordinates (R, C) is Normal.
      4 ELSE BEGIN MOS[R,C] ≠ 0. Initialize a cause list for the geographic region represented by coordinates (R, C) to be an empty list.
         4a. FOR each value of signal-reception status matrices MMC[R,C], MTN[R,C]....
            4b. IF the R,C value of the signal-reception status matrix for a cause C > 0, THEN add cause C to the list. END IF
         4c. END FOR of the loop started at block 4a.
         4d. IF the cause list for the geographic region represented by coordinates (R, C) is an empty list, THEN output "unknown cause"
         4e. ELSE the cause list is not empty. In some embodiments, the cause list can be stored by signal-reception status matrix values; e.g., a cause associated with signal-reception status value of 3 (representing a cause with a likely disruptive effect on signal reception) would be sorted to precede listing of a cause associated with signal-reception status value of 1 (representing a cause with a likely effect on signal reception). Then, output the causes as indicated in the cause list.
         4f. ENDIF for the IF statement started at block 4d.
     5. END IF for the IF statement started at block 3.
   6. END FOR of the loop started at block 2.
7. END FOR of the loop started at block 2.

As one set of examples, the numerical values assigned to outage status values for regions 622, 632, and 634 are 0, where 0 represents a normal region. As these regions are normal, there should be no cause degrading signal-reception statuses in those regions. In some embodiments, outage tracking server 122 can examine cause maps in normal regions to determine whether conditions may indicate a future outage in a normal region; e.g., if meteorological conditions in a normal region indicate a likely effect on signal disruption, then the weather may cause a future outage in that normal region. In these embodiments, outage tracking server 122 can predict a future outage and/or request additional information; e.g., request set-top box data in the normal, request up-to-date information about meteorological conditions in the normal region. Based on the normal outage status of regions 622, 632, and 634, outage tracking server 122 can output entries in outage status/likely cause(s) list 770 for geographical regions "622", "632", and "634" to indicate that each region is "Normal" as part of scenario 600.

As another example, an outage status of geographical region 602 is represented by cell (1, 1) of matrix MOS. MOS(1, 1) has a value of "1" representing a possibly degraded outage status in geographical region 602. Taking the (1,1) values of matrices of numerical representations of signal-reception statuses for maps 720-760, in order, as indicated by blocks 4a-4c of Table 3 above, would lead to the following list or vector of signal-reception statuses: [1 0 0 0 0], indicating the only cause having a likely effect on signal reception in geographical region 602 is a meteorological cause. Based on this information, outage tracking server 122 can output an entry in outage status/likely cause (s) list 770 for geographical region 602 to indicate that region "602" is "Possibly Degraded Due to Weather."

As another example, an outage status of geographical region 616 is represented by cell (2, 3) of matrix MOS. MOS(2, 3) has a value of "3" representing an outage status of regional outage status in geographical region 616. Taking the (2, 3) values of matrices of numerical representations of signal-reception statuses for maps 720-760, in order, as indicated by blocks 4a-4c of Table 3 above, would lead to the following list or vector of signal-reception statuses: [2 1 3 0 0], indicating three causes probably affecting signal reception in geographical region 616: a meteorological cause having a possibly disruptive effect, a terrestrial network cause having a likely effect, and a network delay cause having a likely disruptive effect. As indicated at block 4e of Table 3, outage tracking server 122 can sort the three causes probably affecting signal reception in geographical region 616 based on signal-reception status values; e.g., to indicate that the network delay cause is most likely to be the biggest single cause, and the terrestrial network cause is least likely to be the biggest single cause. Based on this information, outage tracking server 122 can output an entry in outage status/likely cause(s) list 770 for geographical region 616 to indicate that region "616" has an outage status of "Regional Outage" and that the causes for the regional outage are "Network Delay and Weather" with an indication that "Terrestrial Network may affect reception as well."

FIG. 8 shows example displays for scenario 600. In scenario 600, outage tracking server 122 can determine that nine geographical regions have a non-normal outage status, and are possibly or actually undergoing an outage in those regions. Outage tracking server 122 can provide outage-related information to set-top boxes in these nine geographical regions with a non-normal outage status, so that the set-top boxes can display the outage-related information to set-top box customers.

In scenario 600, geographical region 606 has a degraded service outage status. To inform set-top box customers of the degraded service condition, outage tracking server 122 can provide information to set-top boxes in geographical region 606 that can be displayed, such as indicated by display 810 of FIG. 8 for region 606. Display 810 includes outage-related information as part of a display screen for upcoming movies. The outage-related information in display 810 includes a "NOTICE" that "THIS REGION MAY BE EXPERIENCING AN OUTAGE" with a possible cause of "THE WEATHER" and an expected outage duration that "[t]his condition will last until about 8 PM." Set-top box customers also are informed by display 810 that "[o]ur call center knows about this possible outage, so please do not call regarding service until after the outage is expected to end (8 PM)."

Outage tracking server 122 can provide different information based on geographical region; e.g., causes affecting signal reception in the geographical region, expected duration of the outage (if any) for the geographical region, outage status of the geographical region, and perhaps other information. For example, region 616 display 820 of FIG. 8 includes outage-related information for geographical region 616 as part of a display screen for upcoming movies. The outage-related information in display 820 includes a "NOTICE" that "THIS REGION IS EXPERIENCING AN OUTAGE" having causes of "WEATHER AND NETWORK-RELATED ISSUES" and that the expected duration of the outage is an "INDEFINITE DURATION." Set-top box customers also are informed by display 820 that "[o]ur call center knows about this outage, so please do not call regarding service while this notice is displayed". Many other customer oriented displays related to outages are possible as well.

Other techniques to provide outputs with outage-related information are possible as well. For example, upon determining a (changed) non-normal outage status for a particular geographical region, determining (a changed) set of possible causes for the non-normal outage status, and/or determining a (changed) possible duration for the non-normal outage status, then outage tracking server 122 can look up customer account information for customers having set-top boxes located in the particular geographic region. The customer account information can include an outage-notification preference, such as, but not limited to, providing outage-related information via set-top box as discussed in the context of FIG. 8, via e-mail to an e-mail address specified in the customer account information, via text message to a text address (e.g., telephone number) specified in the customer account information, via voice message to a telephone number specified in the customer account information, via one or more web sites, and/or via other delivery techniques.

If the customer account information does not indicate an outage-notification preference for a particular customer account, a default preference for provide outage-related information can be made for the particular customer account. Example default choices for providing outage-related information are providing the information via set-top box and/or via one or more web sites, as these choices do not require additional information such as an e-mail address or phone number to be communicated from outage tracking server 122 to a customer.

Outage tracking server 122 can provide outage-related information to non-customer entities as well. For example, upon determining a (change in) non-normal outage status for a particular geographical region, determining (a changed) set of possible causes for the non-normal outage status, determining a (changed) possible duration for the non-normal outage status, outage tracking server 122 can provide outage-related information to one or more customer support organizations, call centers, technicians, managers, regulatory agencies (if required), web sites, blogs, and/or other entities utilizing outage-related information. Thus, outage tracking server 122 can provide customers and others with outage-related information for the particular geographical region, where the outage-related information is determined by aggregating signal-related data from one or more devices; e.g., set-top boxes, located in the particular geographical region.

VI. Example Methods of Operation

Figure 9:
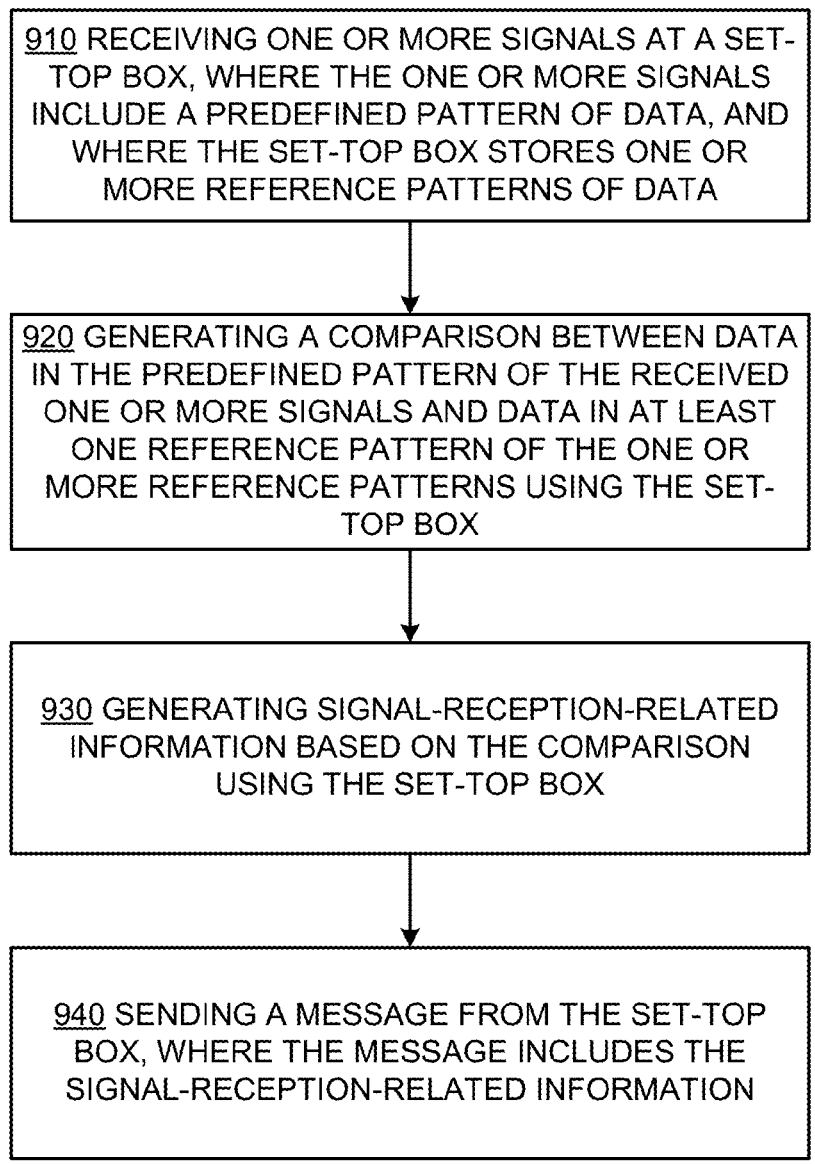
FIG. 9 is a flow diagram depicting an example method described herein.

FIG. 9 is a flow diagram depicting example method 900 described herein. Method 900 can be carried out by a set-top box, such as set-top box 106, 106A, 106B, 106C, 106D, 106E, 106F, 108, or perhaps a computing device or server device configured to act as a set-top box, such as computing device 200 or server device 300.

Method 900 can begin at block 910, where a set-top box can receive one or more signals. The one or more signals can include a predefined pattern of data. The set-top box can store one or more reference patterns of data.

At block 920, the set-top box can generate a comparison between data in the predefined pattern of the received one or more signals and data in at least one reference pattern of the one or more reference patterns. In some embodiments, generating the comparison between data in the predefined pattern of the received one or more signals and data in at least one reference pattern can include selecting the at least one reference pattern from the one or more reference patterns based on time.

In other embodiments, the one or more signals can be associated with a designated channel. Then, generating the comparison between data in the predefined pattern of the received one or more signals and data in at least one reference pattern can include selecting the at least one reference pattern from the one or more reference patterns based on the designated channel. In still other embodiments, the data can be one or more of video data, audio data, data bits, signal frequency data, and signal strength data.

At block 930, the set-top box can generate signal-reception-related information based on the comparison.

At block 940, the set-top box can send a message that includes the signal-reception-related information.

In some embodiments, method 900 can further include that the set-top box can receive a request to provide the signal-reception-related information. In these embodiments, the message can include a response to the request to provide the signal-reception-related information. In particular embodiments, receiving the request to provide the signal-reception-related information can include receiving the request to provide the signal-reception-related information via a user interface associated with the set-top box.

In more particular embodiments, the one or more reference patterns can include a plurality of reference patterns. Then, the predefined pattern can be associated with a first plurality of predefined patterns, where each reference pattern in the plurality of reference patterns can correspond to a predefined pattern in the first plurality of predefined patterns. In even more particular embodiments, receiving the one or more signals can include receiving the one or more signals from a channel dedicated for testing, where the channel dedicated for testing is configured to communicate a second plurality of predefined patterns, and where the second plurality of predefined patterns comprise the predefined pattern.

In other embodiments, method 900 can further include generating an output of the set-top box based on the signal-reception-related information using a user interface of the set-top box. In still other embodiments, method 900 can further include: storing the signal-reception-related information in data storage of the set-top box; receiving a request for signal-reception-related information at the set-top box; after receiving the request, retrieving the signal-reception-related information from the data storage of the set-top box; and generating a response to the request for signal-reception-related information, where the response is based on the retrieved signal-reception-related information.

Figure 10:
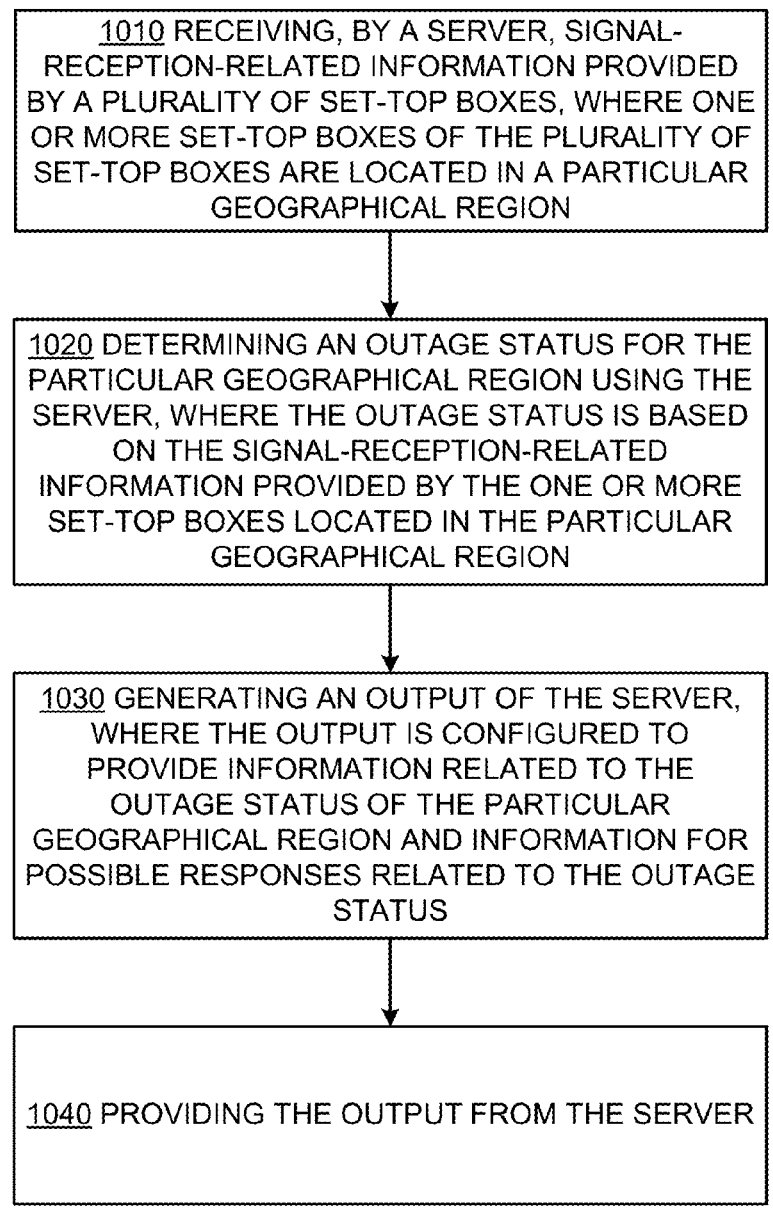
FIG. 10 is a flow diagram depicting another example method described herein.

FIG. 10 is a flow diagram depicting example method 1000 described herein. Method 1000 can be carried out by a server, such as one or more of head end 104, connection server 114, outage tracking server 122, server 300, or perhaps a computing device configured to act as a server, such as computing device 200.

Method 1000 can begin at block 1010, where a server can receive signal-reception-related information. The signal-reception-related information can be provided by a plurality of set-top boxes. One or more set-top boxes of the plurality of set-top boxes can be located in a particular geographical region.

In some embodiments, receiving signal-reception-related information can include: determining a rate for receiving signal-reception-related information for the particular geographical region based on an outage-status value for the particular geographical region associated with the outage status for the particular geographical region.

In particular embodiments, receiving signal-reception-related information can include: sending one or more requests for the signal-reception-related information to one or more set-top boxes within the particular geographical area at the rate for receiving signal-reception-related information; and in response to the one or more requests for the signal-reception-related information, receiving one or more messages from the one or more set-top boxes within the particular geographical area, where the one or more messages include the signal-reception-related information.

In other particular embodiments, receiving signal-reception-related information can include: sending the rate for receiving signal-reception-related information to a set-top box within the particular geographical area; and receiving one or more messages from the set-top box within the particular geographical area at the rate for receiving signal-reception-related information, where the one or more messages include the signal-reception-related information.

In still other particular embodiments, receiving signal-reception-related information can include: requesting the signal-reception-related information from the set-top box within the particular geographical area.

In even other particular embodiments, receiving signal-reception-related information includes receiving signal-reception-related information from a set-top box of the one or more set-top boxes located in the particular geographical area. In these embodiments, receiving signal-reception-related information from the set-top box can include some or all of the procedures of method 900 discussed above in the context of FIG. 9.

At block 1020, the server can determine an outage status for the particular geographical region. The outage status can be based on the signal-reception-related information provided by the one or more set-top boxes located in the particular geographical region;

In some embodiments, determining the outage status for the particular geographical region can include: updating an outage-status value for the particular geographical region based on the signal-reception-related information provided by one or more set-top boxes located in the particular geographical region; after determining that the outage-status value exceeds a first threshold value, setting the outage status to possibly degraded; determining one or more possible causes for an outage; determining a cause status for at least one possible cause for the outage of the one or more possible causes; and determining a most likely cause for the outage based on the cause statuses for at least one possible cause for the outage.

In particular of these embodiments, determining the outage status for the particular geographical region can further include: after determining that the outage-status value does not exceed the first threshold value and does exceed a second threshold value: setting the outage status to degraded; determining one or more possible causes for a likely outage; determining a cause status for at least one possible cause for the likely outage of the one or more possible causes for the likely outage; and determining a likely cause of an outage based on the cause statuses for the at least one possible cause for the likely outage.

In more particular of these embodiments, the one or more possible causes for the outage and the one or more possible causes for the likely outage can each be selected from the group of causes consisting of: a meteorologically-related cause, a satellite-related cause, a terrestrial-network-related cause, a network-traffic-related cause, and a solar-radiation-related cause.

In other more particular embodiments, determining the outage status for the particular geographical region can further include: after determining that the outage-status value does not exceed the second threshold value, setting the outage status to normal.

At block 1030, the server can generate an output. The output can be configured to provide information related to the outage status of the particular geographical region and information for possible responses related to the outage status.

In some embodiments, generating the output of the server can include: determining whether the outage status is set to degraded; after determining that the outage status is set to degraded, generating an output to indicate an outage is occurring and to provide the most likely cause for the outage; otherwise, determining whether the outage status is set to possibly degraded; after determining that the outage status is set to likely-outage, and generating an output to indicate an outage is likely and to indicate the likely cause for the outage.

At block 1040, the server can provide the output. In some embodiments, providing the output can include one or more of: providing the output via at least one set-top box located in the geographical region, providing the output via a web site, providing the output via an e-mail, providing the output via a text message, and providing the output via a voice message.

VII. Conclusion

While the methods described herein illustrate a number of blocks that are in a sequential order, these blocks may also be performed in parallel or in a different order than those described herein. Also, the various blocks may be combined into fewer blocks, or divided into additional blocks. In addition, it should be understood that the flow diagrams show functionality and operation of possible implementations of the present embodiments, though other implementations are also possible. Moreover, each block in the flow diagrams may represent a module, a segment, or a portion of program code that includes one or more instructions executable by a processor for implementing specific logical functions or steps in the process. The program code may be stored on data storage.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:

receiving, by a server, signal-reception-related information provided by a plurality of set-top boxes, wherein one or more set-top boxes of the plurality of set-top boxes are located in a particular geographical region, and wherein the signal-reception-related information for a particular set-top box of the plurality of set-top boxes comprises location information;

determining, by the server, whether the particular set-top box is located in the particular geographical region based on the location information;

after determining that the particular set-top box is located in the particular geographical region:

determining, by the server, whether the particular set-top box is undergoing an outage based on the signal-reception-related information for the particular set-top box, and in response to determining that the particular set-top box is undergoing an outage, incrementing, by the server, a number of down set-top boxes in the particular geographical region;

determining an outage status for the particular geographical region using the server, wherein the outage status is based on the number of down set-top boxes in the particular geographical region;

generating an output of the server, wherein the output is configured to provide information related to the outage status of the particular geographical region and information for possible responses related to the outage status;

providing the output from the server, wherein the output is provided via a voice message to a telephone number of a communication device associated with a target set-top box located in the particular geographical region; and determining, by the server for the particular geographical region, a testing rate having a first frequency for receiving the signal-reception-related information, wherein the testing rate is determined based on the outage status for the particular geographical region, wherein the first frequency is different than a second frequency for receiving other signal-reception-related information for another geographical region in which one or more of the set-top boxes of the plurality of set-top boxes is located.

2. The method of claim 1, wherein determining the outage status for the particular geographical region comprises:

updating an outage-status value for the particular geographical region based on the signal-reception-related information provided by one or more set-top boxes located in the particular geographical region;

after determining that the outage-status value exceeds a first threshold value, setting the outage status to possibly degraded;

determining one or more possible causes for an outage;

determining a cause status for at least one possible cause for the outage of the one or more possible causes; and determining a first cause for the outage based on the cause statuses for at least one possible cause for the outage.

3. The method of claim 2, wherein determining the outage status for the particular geographical region further comprises:

after determining that the outage-status value does not exceed the first threshold value and does exceed a second threshold value:

setting the outage status to degraded;

determining one or more possible causes for an outage;

determining a cause status for at least one possible cause for the outage of the one or more possible causes for the outage; and determining a second cause of an outage based on the cause statuses for the at least one possible cause for the outage.

4. The method of claim 3, wherein the one or more possible causes for the outage are each selected from a group of causes consisting of: a meteorologically-related cause, a satellite-related cause, a terrestrial-network-related cause, a network-traffic-related cause, and a solar-radiation-related cause.

5. The method of claim 3, wherein determining the outage status for the particular geographical region further comprises:

after determining that the outage-status value does not exceed the second threshold value, setting the outage status to normal.

6. The method of claim 3, wherein generating the output of the server comprises:
  determining whether the outage status is set to degraded;
  after determining that the outage status is set to degraded, generating an output to indicate an outage is occurring and to provide a cause for the outage;
  otherwise, determining whether the outage status is set to possibly degraded; and
  after determining that the outage status is set to possibly degraded, generating an output to indicate the outage status and a cause for the outage.

7. The method of claim 1, wherein the testing rate is based on an outage-status value for the particular geographical region associated with the outage status for the particular geographical region.

8. The method of claim 7, wherein receiving signal-reception-related information comprises:
  sending one or more requests for the signal-reception-related information to the one or more set-top boxes located in the particular geographical region at the testing rate for receiving signal-reception-related information; and
  in response to the one or more requests for the signal-reception-related information, receiving one or more messages from the one or more set-top boxes within the particular geographical region, wherein the one or more messages include the signal-reception-related information.

9. The method of claim 7, wherein receiving signal-reception-related information comprises:
  sending the testing rate for receiving signal-reception-related information to a set-top box within the particular geographical region; and
  receiving one or more messages from the set-top box within the particular geographical region at the testing rate for receiving signal-reception-related information, wherein the one or more messages include the signal-reception-related information.

10. The method of claim 9, wherein providing the output further comprises one or more of: providing the output via a web site, providing the output via an e-mail, and providing the output via a text message.

11. The method of claim 1, wherein receiving signal-reception-related information comprises receiving signal-reception-related information from a first set-top box of the one or more set-top boxes located in the particular geographical region.

12. The method of claim 11, wherein receiving signal-reception-related information from the first set-top box comprises:
  receiving one or more signals at the first set-top box, wherein the one or more signals comprise a predefined pattern of data, wherein the first set-top box stores one or more reference patterns of data;
  generating a comparison between data in the predefined pattern of received one or more signals and data in at least one reference pattern of the one or more reference patterns using the first set-top box;
  generating signal-reception-related information based on the comparison using the first set-top box; and
  sending a message from the first set-top box, wherein the message comprises the signal-reception-related information.

13. The method of claim 12, further comprising:
  receiving a request to provide the signal-reception-related information at the first set-top box;
  wherein the message comprises a response to the request to provide the signal-reception-related information.

14. The method of claim 13, wherein receiving the request to provide the signal-reception-related information comprises receiving the request to provide the signal-reception-related information via a user interface associated with the first set-top box.

15. The method of claim 14, wherein one or more reference patterns comprise a plurality of reference patterns, wherein the predefined pattern is associated with a first plurality of predefined patterns, and wherein each reference pattern in the plurality of reference patterns corresponds to a predefined pattern in the first plurality of predefined patterns.

16. The method of claim 15, wherein receiving the one or more signals comprises receiving the one or more signals from a channel dedicated for testing, wherein the channel dedicated for testing is configured to communicate a second plurality of predefined patterns, and wherein the second plurality of predefined patterns comprise the predefined pattern.

17. The method of claim 12, wherein generating the comparison between data in the predefined pattern of the received one or more signals and data in at least one reference pattern comprises selecting the at least one reference pattern from the one or more reference patterns based on time.

18. The method of claim 12, wherein the one or more signals are associated with a designated channel, and wherein generating the comparison between data in the predefined pattern of the received one or more signals and data in at least one reference pattern comprises selecting the at least one reference pattern from the one or more reference patterns based on the designated channel.

19. The method of claim 11, further comprising:
  generating an output of the first set-top box based on the signal-reception-related information using a user interface of the first set-top box.

20. The method of claim 11, further comprising:
  storing the signal-reception-related information in data storage of the first set-top box;
  receiving a request for signal-reception-related information at the first set-top box;
  after receiving the request, retrieving the signal-reception-related information from the data storage of the first set-top box; and
  generating a response to the request for signal-reception-related information, wherein the response is based on the retrieved signal-reception-related information.

21. The method of claim 12, wherein the data are one or more of video data, audio data, data bits, signal frequency data, and signal strength data.

22. A server, comprising:
  a processor; and
  a memory storing computer-readable program instructions that, upon execution by the processor, cause the server to perform functions comprising:
  receiving signal-reception-related information provided by a plurality of set-top boxes, wherein one or more set-top boxes of the plurality of set-top boxes are located in a particular geographical region, wherein the signal-reception-related information for a particular set-top box of the plurality of set-top boxes comprises location information;
  determining whether the particular set-top box is located in the particular geographical region based on the location information;

after determining that the particular set-top box is located in the particular geographical region:
  determining whether the particular set-top box is undergoing an outage based on the signal-reception-related information for the particular set-top box, and
  in response to determining that the particular set-top box is undergoing an outage, incrementing a number of down set-top boxes in the particular geographical region;
determining an outage status for the particular geographical region, wherein the outage status is based on the number of down set-top boxes in the particular geographical region;
generating an output configured to provide information related to the outage status of the particular geographical region and information for possible responses related to the outage status;
providing the output, wherein the output is provided via a target set-top box located in the particular geographical region and via a voice message to a communication device associated with the target set-top box; and
determining an enhanced testing rate for receiving the signal-reception-related information for the particular geographical region, wherein the enhanced testing rate is determined based on the outage status for the particular geographical region,
wherein the enhanced testing rate is more frequent than a standard testing rate for receiving other signal-reception-related information for another geographical region in which one or more of the set-top boxes of the plurality of set-top boxes is located.

23. The server of claim 22, wherein determining the outage status for the particular geographical region comprises:
  updating an outage-status value for the particular geographical region based on the signal-reception-related information provided by one or more set-top boxes located in the particular geographical region;
  after determining that the outage-status value exceeds a first threshold value, setting the outage status to possibly degraded;
  determining one or more possible causes for an outage;
  determining a cause status for at least one possible cause for the outage of the one or more possible causes; and
  determining a first cause for the outage based on the cause statuses for at least one possible cause for the outage.

24. The server of claim 23, wherein determining the outage status for the particular geographical region further comprises:
  after determining that the outage-status value does not exceed the first threshold value and does exceed a second threshold value:
    setting the outage status to degraded;
    determining one or more possible causes for an outage;
    determining a cause status for at least one possible cause for the outage of the one or more possible causes for the outage; and
    determining a second cause of an outage based on the cause statuses for the at least one possible cause for the outage.

25. The server of claim 24, wherein determining the outage status for the particular geographical region further comprises:
  after determining that the outage-status value does not exceed the second threshold value, setting the outage status to normal.

26. The server of claim 22, wherein receiving signal-reception-related information comprises:
  receiving one or more signals at a set-top box of the one or more set-top boxes located in the particular geographical region, wherein the one or more signals comprise a predefined pattern of data, wherein the set-top box stores one or more reference patterns of data;
  generating a comparison between data in the predefined pattern of received one or more signals and data in at least one reference pattern of the one or more reference patterns using the set-top box;
  generating signal-reception-related information based on the comparison using the set-top box; and
  sending a message from the set-top box, wherein the message comprises the signal-reception-related information.

27. A non-transitory computer-readable storage medium storing computer-readable program instructions that, upon execution by a processing system including a processor, cause the processing system to perform functions comprising:
  receiving signal-reception-related information provided by a plurality of set-top boxes, wherein one or more set-top boxes of the plurality of set-top boxes are located in a particular geographical region, and wherein the signal-reception-related information for a particular set-top box of the plurality of set-top boxes comprises location information;
  determining whether the particular set-top box is located in the particular geographical region based on the location information;
  after determining that the particular set-top box is located in the particular geographical region:
    determining whether the particular set-top box is undergoing an outage based on the signal-reception-related information for the particular set-top box, and
    in response to determining that the particular set-top box is undergoing an outage, incrementing a number of down set-top boxes in the particular geographical region;
  determining an outage status for the particular geographical region, wherein the outage status is based on the number of down set-top boxes in the particular geographical region;
  generating an output configured to provide information related to the outage status of the particular geographical region and information for possible responses related to the outage status;
  providing the output, wherein the output is provided via a voice message to a telephone associated with a target set-top box located in the particular geographical region, the voice message being sent to a telephone number specified in customer account information; and
  determining a reduced testing rate for receiving the signal-reception-related information for the particular geographical region, wherein the reduced testing rate is determined based on the outage status for the particular geographical region,
  wherein the reduced testing rate is less frequent than a standard testing rate for receiving other signal-reception-related information for another geographical region in which one or more of the set-top boxes of the plurality of set-top boxes is located.

28. The non-transitory computer-readable storage medium of claim 27, wherein determining the outage status for the particular geographical region comprises:

updating an outage-status value for the particular geographical region based on the signal-reception-related information provided by one or more set-top boxes located in the particular geographical region;
after determining that the outage-status value exceeds a first threshold value, setting the outage status to possibly degraded;
determining one or more possible causes for an outage;
determining a cause status for at least one possible cause for the outage of the one or more possible causes; and
determining a first cause for the outage based on the cause statuses for at least one possible cause for the outage.

29. The non-transitory computer-readable storage medium of claim 28, wherein determining the outage status for the particular geographical region further comprises:
after determining that the outage-status value does not exceed the first threshold value and does exceed a second threshold value:
setting the outage status to degraded;
determining one or more possible causes for an outage;
determining a cause status for at least one possible cause for the outage of the one or more possible causes for the outage; and
determining a second cause of an outage based on the cause statuses for the at least one possible cause for the outage.

30. The non-transitory computer-readable storage medium of claim 29, wherein determining the outage status for the particular geographical region further comprises:
after determining that the outage-status value does not exceed the second threshold value, setting the outage status to normal.

31. The non-transitory computer-readable storage medium of claim 27, wherein receiving signal-reception-related information comprises:
receiving one or more signals at a set-top box of the one or more set-top boxes located in the particular geographical region, wherein the one or more signals comprise a predefined pattern of data, wherein the set-top box stores one or more reference patterns of data;
generating a comparison between data in the predefined pattern of received one or more signals and data in at least one reference pattern of the one or more reference patterns using the set-top box;
generating signal-reception-related information based on the comparison using the set-top box; and
sending a message from the set-top box, wherein the message comprises the signal-reception-related information.

* * * * *